(12) United States Patent
Saito

(10) Patent No.: US 10,158,794 B2
(45) Date of Patent: Dec. 18, 2018

(54) LIGHTING DEVICE THAT CONTROLS LIGHT EMISSION WHILE SUPPRESSING TEMPERATURE RISE, IMAGE PICKUP APPARATUS, AND METHOD OF CONTROLLING LIGHTING DEVICE

(71) Applicant: CANON KABUSHIKI KAISHA, Tokyo (JP)

(72) Inventor: Keiichiro Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/446,854

(22) Filed: Mar. 1, 2017

(65) Prior Publication Data
US 2017/0257541 A1 Sep. 7, 2017

(30) Foreign Application Priority Data

Mar. 3, 2016 (JP) .................. 2016-041116

(51) Int. Cl.
| | | |
|---|---|---|
| H04N 5/225 | (2006.01) | |
| G03B 15/05 | (2006.01) | |
| H05B 37/02 | (2006.01) | |
| H05B 41/39 | (2006.01) | |
| H05B 41/32 | (2006.01) | |

(52) U.S. Cl.
CPC ........... *H04N 5/2256* (2013.01); *G03B 15/05* (2013.01); *H05B 37/0227* (2013.01); *H05B 41/325* (2013.01); *H05B 41/39* (2013.01); *G03B 2215/0592* (2013.01)

(58) Field of Classification Search
CPC ............................ H05B 41/325; H05B 41/39
See application file for complete search history.

(56) References Cited

U.S. PATENT DOCUMENTS

| | | | | |
|---|---|---|---|---|
| 5,485,201 A | * | 1/1996 | Aoki ................. | G03B 7/16 348/223.1 |
| 5,729,772 A | * | 3/1998 | Sato .................. | G03B 15/05 396/159 |
| 9,547,219 B2 | * | 1/2017 | Jang ................. | G03B 17/14 |
| 9,716,818 B2 | * | 7/2017 | Saito ................ | H04N 5/2256 |
| 9,781,319 B2 | * | 10/2017 | Barros .............. | H04N 5/2252 |

(Continued)

FOREIGN PATENT DOCUMENTS

| | | | |
|---|---|---|---|
| JP | 2008-185699 A | | 8/2008 |
| JP | 2013142883 A | * | 7/2013 ............. G03B 15/05 |

OTHER PUBLICATIONS

JP 2013-142883A; Aoyama et al; Canon; Jul. 22, 2013; Camera System Including Flash Device; Machine English Translation; pp. 1-18.*

*Primary Examiner* — Cynthia Segura
(74) *Attorney, Agent, or Firm* — Cowan, Liebowitz & Latman, P.C.

(57) ABSTRACT

A lighting device capable of performing satisfactory light emission control while suppressing a rise in the temperature of the lighting device irrespective of the attachment of an optical accessory. In the lighting device, an accessory detection section detects whether or not an optical accessory for color adjustment or light distribution angle adjustment is attached to a light emission section, and light emission performed by the light emission section is limited based on a result of detection performed by the accessory detection section.

9 Claims, 15 Drawing Sheets

(56) References Cited

U.S. PATENT DOCUMENTS

| | | | | |
|---|---|---|---|---|
| 2003/0007800 A1* | 1/2003 | Uchida | ............... | G03B 15/05 396/176 |
| 2010/0124041 A1* | 5/2010 | Druchinin | ............. | G03B 11/00 362/16 |
| 2012/0293092 A1* | 11/2012 | Yim | ................ | H05B 33/0854 315/308 |
| 2013/0176482 A1* | 7/2013 | Hirasawa | ............... | G03B 7/16 348/370 |
| 2015/0108908 A1* | 4/2015 | Denvir | ............. | H05B 33/0815 315/186 |
| 2017/0318647 A1* | 11/2017 | Vangeel | ............... | G06F 8/654 |

* cited by examiner

FIG. 10

| CONTROL STAGE | GAIN | | | | | |
|---|---|---|---|---|---|---|
| | NORMAL TIME | CF1 | CF2 | BA | CF1+BA | CF2+BA |
| 1ST STAGE | 3 | 3 | 4 | 3 | 3 | 4 |
| 2ND STAGE | 1 | 1 | 2 | 2 | 2 | 1 |
| 3RD STAGE | 1 | 2 | 1 | 4 | 2 | 2 |
| 4TH STAGE | 1 | 1 | 1 | 4 | 1 | 2 |
| 5TH STAGE | 1 | 2 | 2 | 4 | 2 | 2 |
| 6TH STAGE (1ST WARNING STAGE) | 2 | 2 | 3 | 2 | 2 | 3 |
| 7TH STAGE (2ND WARNING STAGE) | 3 | 3 | 4 | 3 | 3 | 4 |

LIGHTING DEVICE THAT CONTROLS LIGHT EMISSION WHILE SUPPRESSING TEMPERATURE RISE, IMAGE PICKUP APPARATUS, AND METHOD OF CONTROLLING LIGHTING DEVICE

BACKGROUND OF THE INVENTION

Field of the Invention

The present invention relates to a lighting device that controls light emission while suppressing a temperature rise, an image pickup apparatus, a method of controlling the lighting device, and more particularly to a lighting device to which an optical accessory can be attached.

Description of the Related Art

In general, in a lighting device, such as a strobe device, used for an image pickup apparatus, such as a digital camera, limitation is set to light emission so as to prevent a user from feeling uncomfortable due to a rise in the temperature of the lighting device caused by heat generated by light emission. On the other hand, if limitation is set to light emission, the timing in which the lighting device can emit light is limited, causing a case where light emission is suddenly inhibited during shooting.

To cope with such a problem, there has been proposed a strobe device that is equipped with a light emission counter that adds a count corresponding to an amount of heat generated by light emission, and configured to limit light emission when the count counted by the light emission counter reaches a predetermined count (see e.g. Japanese Patent Laid-Open Publication No. 2008-185699).

Examples of the lighting device used for an image pickup apparatus, such as a digital camera, include one having a light emission section to which a color filter for adjusting color of light can be attached. Further, there is a lighting device to which a bounce adapter can be attached for enhancing a bounce effect of spreading light in a wide range and suppressing shadow of an object when performing flash shooting (so-called bounce flash shooting) in which light is irradiated e.g. toward a ceiling or a wall and the object is illuminated by diffusely reflected light from the ceiling or the wall. Furthermore, there is a lighting device to which a diffuser can be attached so as to obtain natural-like lighting by softening light directly irradiated to an object. Thus, various optical accessories are attached to the lighting device, for use in shooting. In a state in which any of these optical accessories is attached, the temperature of the lighting device is more likely to be increased by heat generated by light emission than in a state in which no optical accessory is attached. However, in Japanese Patent Laid-Open Publication No. 2008-185699, no consideration is given to the state in which an optical accessory is attached.

SUMMARY OF THE INVENTION

The present invention provides a lighting device that is capable of performing satisfactory light emission control while suppressing a rise in the temperature of the lighting device irrespective of the attachment of an optical accessory, an image pickup apparatus, and a method of controlling the lighting device.

In a first aspect of the invention, there is provided a lighting device comprising a light emission unit, a detection unit configured to detect whether or not an optical accessory for color adjustment or light distribution angle adjustment is attached to the light emission unit, and a control unit configured to limit light emission performed by the light emission unit based on a result of detection by the detection unit.

In a second aspect of the invention, there is provided a lighting device comprising a light source, a detection unit configured to detect that a specific optical accessory for changing characteristics of light irradiated from the light source is attached, and a suppression unit configured to perform processing for suppressing a temperature rise of the lighting device, based on a result of detection by the detection unit.

In a third aspect of the invention, there is provided an image pickup apparatus including an image pickup unit configured to perform image pickup of an object via an image pickup optical system to thereby obtain an image, and a lighting device, wherein the lighting device comprises a light emission unit, a detection unit configured to detect whether or not an optical accessory for color adjustment or light distribution angle adjustment is attached to the light emission unit, and a control unit configured to limit light emission performed by the light emission unit based on a result of detection by the detection unit.

In a fourth aspect of the invention, there is provided an image pickup apparatus including an image pickup unit configured to perform image pickup of an object via an image pickup optical system to thereby obtain an image, and a lighting device, wherein the lighting device comprises a light source, a detection unit configured to detect that a specific optical accessory for changing characteristics of light irradiated from the light source is attached, and a suppression unit configured to perform processing for suppressing a temperature rise of the lighting device, based on a result of detection by the detection unit.

In a fifth aspect of the invention, there is provided a method of controlling a lighting device, comprising detecting whether or not an optical accessory for color adjustment or light distribution angle adjustment is attached to a light emission unit, by a detection unit, and limiting light emission performed by the light emission unit based on a result of detection by the detection unit, by a control unit.

In a sixth aspect of the invention, there is provided a method of controlling a lighting device, comprising detecting that a specific optical accessory for changing characteristics of light irradiated from a light source is attached, by a detection unit, and performing processing for suppressing a temperature rise of the lighting device, based on a result of detection by the detection unit, by a suppression unit.

According to the present invention, it is possible to perform satisfactory light emission control while suppressing a rise in the temperature of the lighting device irrespective of the attachment of an optical accessory.

Further features of the present invention will become apparent from the following description of exemplary embodiments (with reference to the attached drawings).

BRIEF DESCRIPTION OF THE DRAWINGS

FIGS. 6A to 6C are views useful in explaining an example of a model simulating heat transfer on an optical panel appearing in FIG. 1, in which FIG. 6A shows heat radiation to the optical panel during light emission from a discharge tube, FIG. 6B shows heat transfer from an inner space of a light emission section to the optical panel after light emission from the discharge tube, and FIG. 6C shows heat transfer from the optical panel to an outer space after light emission from the discharge tube.

FIGS. 7A and 7B are views useful in explaining a model simulating heat transfer, caused by light emission, in the inner space of the light emission section appearing in FIG. 1, in which FIG. 7A shows heat transfer to the inner space of the light emission section occurring when the discharge tube emits light, and FIG. 7B shows heat transfer when heat is dissipated from the inner space of the light emission section to the outer space via an exterior.

FIG. 10 is a diagram showing an example of a gain of the internal temperature counter.

FIGS. 11A to 11D are views useful in explaining attachment of an optical accessory to the light emission section appearing in FIG. 1, in which FIG. 11A shows a state in which a color filter is attached as the optical accessory, FIG. 11B shows a state in which a bounce adapter is attached as the optical accessory, FIG. 11C shows an accessory detection unit disposed at the bottom of the light emission section, and FIG. 11D shows a state in which the color filter and the bounce adapter have been attached to the light emission section.

DESCRIPTION OF THE EMBODIMENTS

The present invention will now be described in detail below with reference to the accompanying drawings showing embodiments thereof.

Figure 1:
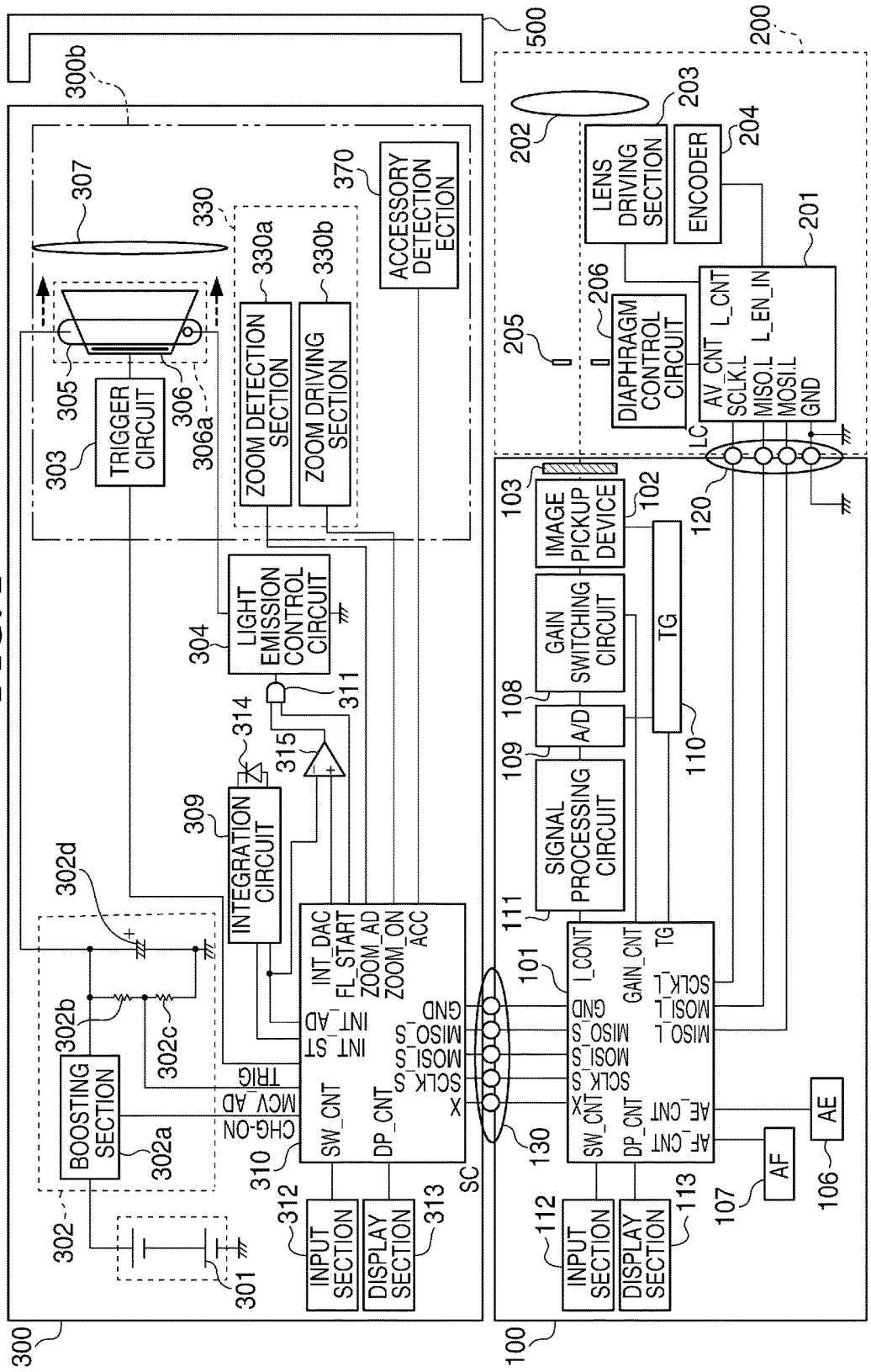
FIG. 1 is a block diagram of a digital camera as an image pickup apparatus equipped with a strobe as a lighting device according to a first embodiment of the present invention.

FIG. 1 is a block diagram of a digital camera as an image pickup apparatus equipped with a strobe as a lighting device according to a first embodiment of the present invention. Further, FIG. 2 is a schematic view, partly broken away, of the image pickup apparatus shown in FIG. 1.

Figure 2:
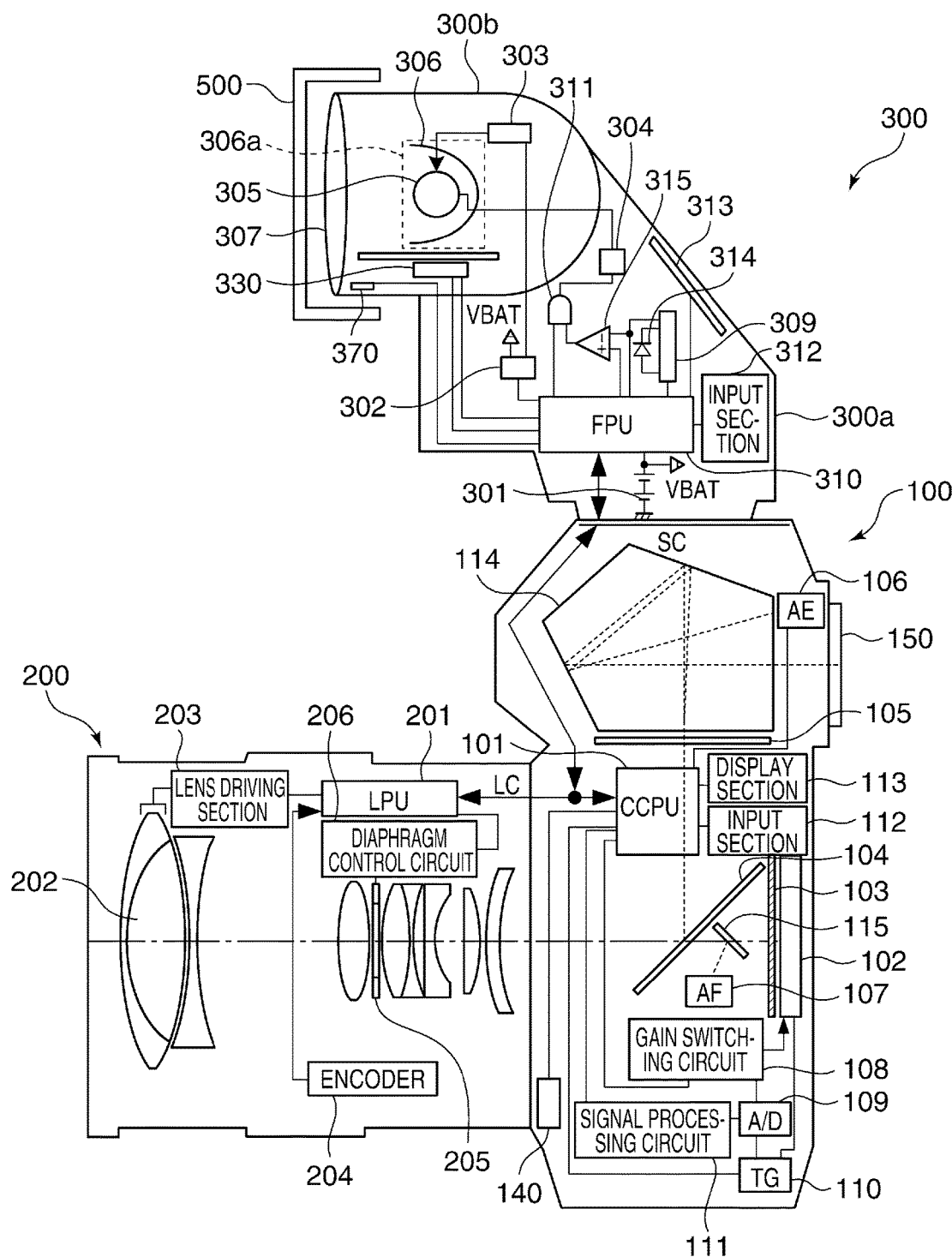
FIG. 2 is a schematic view, partly broken away, of the image pickup apparatus shown in FIG. 1.

Referring to FIGS. 1 and 2, the illustrated image pickup apparatus is e.g. a digital camera (hereinafter simply referred to as the camera), and the camera includes a camera body 100. The camera body 100 has an interchangeable photographic lens unit (hereinafter simply referred to as the "photographic lens": image pickup optical system) 200 mounted thereon. Further, a light emission device, such as a strobe device 300, is removably mounted on the camera body 100. Note that an optical accessory 500 is removably attached to the strobe device (hereinafter simply referred to as the strobe) 300.

The camera body 100 is provided with a microcomputer (CCPU: hereinafter referred to as the "camera microcomputer") 101. The camera microcomputer 101 controls the overall operation of the camera. The camera microcomputer 101 is implemented by a microcomputer-incorporated one-chip IC circuit. The camera microcomputer 101 is comprised of a CPU, a ROM, a RAM, an input/output control circuit, a multiplexer, a timer circuit, an EEPROM, an analog-to-digital converter, and a digital-to-analog converter. Further, the camera microcomputer 101 controls the camera body 100, the photographic lens 200, and the strobe 300 according to programs (i.e. software), and performs various condition determinations.

An image pickup device 102 is implemented by a CCD sensor or a CMOS sensor including an infrared cut filter and a low pass filter. An optical image (object image) is formed on the image pickup device 102 via a lens group 202, described hereinafter, and the image pickup device 102 outputs electrical signals (analog signals) corresponding to the optical image.

A shutter 103 shields the image pickup device 102 from light when shooting is not performed, and opens a shutter curtain to guide an optical image to the image pickup device 102 when shooting is performed. A main mirror (half mirror) 104 reflects light incident through the lens group 202 when shooting is not performed, and causes the reflected light to form an optical image on a focusing plate 105. A photographer visually confirms the optical image projected on the focusing plate 105 through an eyepiece 150.

A photometric circuit (AE) 106 includes a photometric sensor. In this example, an image pickup device, such as a CCD sensor or a CMOS sensor, including a plurality of pixels, is used as the photometric sensor. Before acquiring an image for recording, a digital signal processing circuit 11, described hereinafter, analyzes an image obtained by the photometric circuit 106, to thereby detect a face orientation or the like of an object. Note that an object image formed on the focusing plate 105 enters the photometric sensor through a pentaprism 114.

A focus detection circuit (AF) 107 includes a ranging sensor, and the ranging sensor uses a plurality of points as ranging points, and outputs focus information indicative of a defocus amount on each ranging point. The ranging sensor is divided into a plurality of areas, and the areas include the ranging points.

A gain switching circuit 108 is a circuit for switching a gain for amplifying electrical signals which are outputs from the image pickup device 102. The gain switching circuit 108 performs gain switching e.g. according to a shooting condition and an instruction from the photographer under the control of the camera microcomputer 101. The analog-to-digital converter, denoted by reference numeral 109, converts the electrical signals which are the outputs from the image pickup device 102 to digital signals. A timing generator (TG) 110 synchronizes the electrical signals as the outputs from the image pickup device 102 and the timing of analog-to-digital conversion by the analog-to-digital converter 109.

The digital signal processing circuit (hereinafter also simply referred to as the "signal processing circuit") 111 generates image data by performing image processing on the digital signals which are the outputs from the analog-to-digital converter 109 according to predetermined development parameters. In this example, a memory and the like used for storing processed image data are omitted.

An input section 112 includes a console section provided with a power switch, a release switch, setting buttons, and so forth (none of which are specifically shown), and the camera microcomputer 101 performs various processes according to inputs to the input section 112. When the release switch is half pressed as a first-stage operation, a first release switch SW1 is turned on to cause the camera microcomputer 101 to start a shooting preparation operation including focusing, photometry, etc. Further, when the release switch is fully pressed as a second-stage operation, a second release switch SW2 is turned on to cause the camera microcomputer 101 to start a shooting operation including exposure, development processing, and so forth. Furthermore, by operating the setting buttons provided on the input section 112, it is possible to configure various settings of the strobe 300.

A display section 113 displays shooting information including a shooting mode set for the camera. The display section 113 includes a liquid crystal display, a light emitting element, and so forth.

The pentaprism 114 guides an object image formed on the focusing plate 105 to the photometric sensor of the photometric circuit 106 and the eyepiece 150. A sub mirror 115 guides light passed through the main mirror 104 to the ranging sensor of the focus detection circuit 107. A posture detection circuit 140 is a circuit for detecting a posture of the camera.

Communication lines LC and SC are interfaces connecting between the camera body 100 and the photographic lens 200, and between the camera body 100 and the strobe 300, respectively. For example, the camera body 100, the photographic lens 200, and the strobe 300 exchange data and commands with each other using the camera microcomputer 101 as a host. For example, as shown in FIG. 1, the communication lines LC and SC include terminals 120 and 130, respectively. The terminal 120 includes an SCLK_L terminal, an MOSI_L terminal, an MISO_L terminal, and a GND terminal.

The SCLK_L terminal is a terminal for synchronizing communication between the camera body 100 and the photographic lens (also referred to as the "lens unit") 200. The MOSI_L terminal is a terminal for transmitting data from the camera body 100 to the lens unit 200. The MISO_L terminal is a terminal for receiving data transmitted from the lens unit 200 to the camera body 100. The camera body 100 and the lens unit 200 are connected to the GND terminal.

The terminal 130 includes an SCLK_S terminal, an MOSI_S terminal, an MISO_S terminal, and a GND terminal. The SCLK_S terminal is a terminal for synchronizing communication between the camera body 100 and the strobe 300. The MOSI_S terminal is a terminal for transmitting data from the camera body 100 to the strobe 300. The MISO_S terminal is a terminal for receiving data transmitted from the strobe 300 to the camera body 100. The camera body 100 and the strobe 300 are connected to the GND terminal.

The photographic lens 200 includes a microcomputer (LPU: lens microcomputer) 201. The lens microcomputer 201 controls the overall operation of the photographic lens 200. The lens microcomputer 201 is implemented e.g. by a microcomputer-incorporated one-chip IC circuit which includes a CPU, a ROM, a RAM, an input/output control circuit, a multiplexer, a timer circuit, an EEPROM, an analog-to-digital converter, and a digital-to-analog converter.

The photographic lens 200 includes the lens group 202 having a plurality of lenses. The lens group 202 includes at least a focus lens. A lens driving section 203 moves at least the focus lens of the lens group 202 along an optical axis. The camera microcomputer 101 calculates a driving amount of the lens group 202 based on a detection output from the focus detection circuit 107, and transmits the calculated driving amount to the lens microcomputer 201.

An encoder 204 detects a position of the lens group 202 when the lens group 202 is driven. The lens microcomputer 201 controls the lens driving section 203 according to the driving amount calculated by the camera microcomputer 101. The lens microcomputer 201 controls the driving of the lens group 202 by referring to the position indicated by an output from the encoder 204 so as to perform focusing. A diaphragm control circuit 206 controls a diaphragm 205 under the control of the lens microcomputer 201.

The strobe 300 includes a body 300a removably mounted on the camera body 100, and a light emission section 300b held on the body 300a in a manner rotatable in the vertical direction and a lateral direction with respect to the body. Note that in the following description, the direction of rotation of the light emission section 300b is described assuming that a portion of the body 300a on which the light emission section 300b is mounted is an upper portion of the body 300a.

The strobe 300 includes a microcomputer (FPU: strobe microcomputer) 310. The strobe microcomputer 310 controls the overall operation of the strobe 300. The strobe microcomputer 310 is implemented e.g. by a microcomputer-incorporated one-chip IC circuit which includes a CPU, a ROM, a RAM, an input/output control circuit, a multiplexer, a timer circuit, an EEPROM, an analog-to-digital converter, and a digital-to-analog converter.

A battery 301 is a power supply (VBAT) for the strobe 300. A boosting circuit 302 includes a boosting section 302a, resistors 302b and 302c used for detecting voltage, and a main capacitor 302d. The boosting circuit 302 boosts the voltage of the battery 301 up to several hundred volts by the boosting section 302a, to thereby accumulate electric energy for light emission in the main capacitor 302d. The charge voltage of the main capacitor 302d is divided by the resistors 302b and 302c, and the divided voltage is input to an analog-to-digital converter terminal of the strobe microcomputer 310.

A discharge tube 305 has pulse voltage of several kilovolts applied thereto from a trigger circuit 303, whereby it is excited by an energy charged in the main capacitor 302d to emit light. The light from the discharge tube 305 is irradiated to an object or the like. A light emission control circuit 304 controls the start and stop of light emission from the discharge tube 305.

A photodiode 314 receives light emitted from the discharge tube 305, and outputs a detection output (electric current) corresponding to the amount of light emission from the discharge tube 305. The photodiode 314 receives the light emitted from the discharge tube 305 directly or e.g. via a glass fiber. An integration circuit 309 integrates the electric current output from the photodiode 314. An output (integration output) from the integration circuit 309 is input to an inverting input terminal of a comparator 315 and the analog-to-digital converter terminal of the strobe microcomputer 310.

A non-inverting input terminal of the comparator 315 is connected to a digital-to-analog converter output terminal of the strobe microcomputer 310, and an output terminal of the comparator 315 is connected to one of input terminals of an AND gate 311. The other of the input terminals of the AND gate 311 is connected to a light emission control terminal of the strobe microcomputer 310, and an output terminal of the AND gate 311 is connected to the light emission control circuit 304.

The strobe 300 includes a reflection umbrella unit 306a and a zoom optical system, and a reflection umbrella 306 reflects light emitted from the discharge tube 305, and guides the light in a predetermined direction. The zoom optical system is comprised of an optical panel 307, and changes an irradiation angle of light from the strobe 300. By changing a relative position between the reflection umbrella unit 306a and the optical panel 307, it is possible to change a guide number and the irradiation range of the strobe 300. That is, the relative position between the optical panel 307 and the light emission section 300b can be changed.

The light emission section 300b is comprised of the discharge tube 305, the reflection umbrella 306, and the optical panel 307. The light distribution angle of the light emission section 300b is changed by the movement of the reflection umbrella unit 306a, and the direction of irradiating light from the light emission section 300b is changed by the rotation of the light emission section 300b with respect to the body 300a.

An input section 312 includes an operation section comprised of a power switch, a mode setting switch for setting an operation mode of the strobe 300, and setting buttons for setting various parameters. Further, the strobe microcomputer 310 performs various processes in response to inputs to the input section 312. Information indicative of the state of the strobe 300 is displayed on a display section 313. The display section 313 is provided with a liquid crystal device and a light emitting element.

A zoom driving circuit 330 includes a zoom detection section 330a and a zoom driving section 330b. The zoom detection section 330a detects the relative position between the reflection umbrella unit 306a and the optical panel 307 by an encoder or the like. The zoom driving section 330b moves the reflection umbrella unit 306a using a motor. The strobe microcomputer 310 acquires a focal length from the lens microcomputer 201 via the camera microcomputer 101, and determines a driving amount of the reflection umbrella unit 306a according to the focal length.

An accessory detection unit 370 is a switch for detecting attachment of the optical accessory 500 e.g. for color adjustment or light distribution angle adjustment. The accessory detection unit 370 sends on-off information (detection result) indicative of whether or not the optical accessory 500 is attached to the strobe microcomputer 310. Note that a plurality of optical accessories can be attached at the same time, and in this case, a number of accessory detection units corresponding to the number of the optical accessories are provided. Further, the accessory detection unit is not limited to a switch, but a known sensor may be used as the accessory detection unit.

The optical accessory 500 is a specific accessory for changing characteristics of light emitted from a light source, such as a color filter, a diffuser, or a bounce adapter, and is attached onto the front surface of the optical panel 307 of the light emission section 300b. The optical accessory 500 performs color adjustment, diffusion, or light distribution angle adjustment of the strobe light to thereby increase the lighting effect in shooting. The optical accessory 500 is formed with a protrusion at a location opposed to the accessory detection unit 370, and when the protrusion presses the accessory detection unit 370, attachment of the optical accessory 500 is detected.

Figure 3:
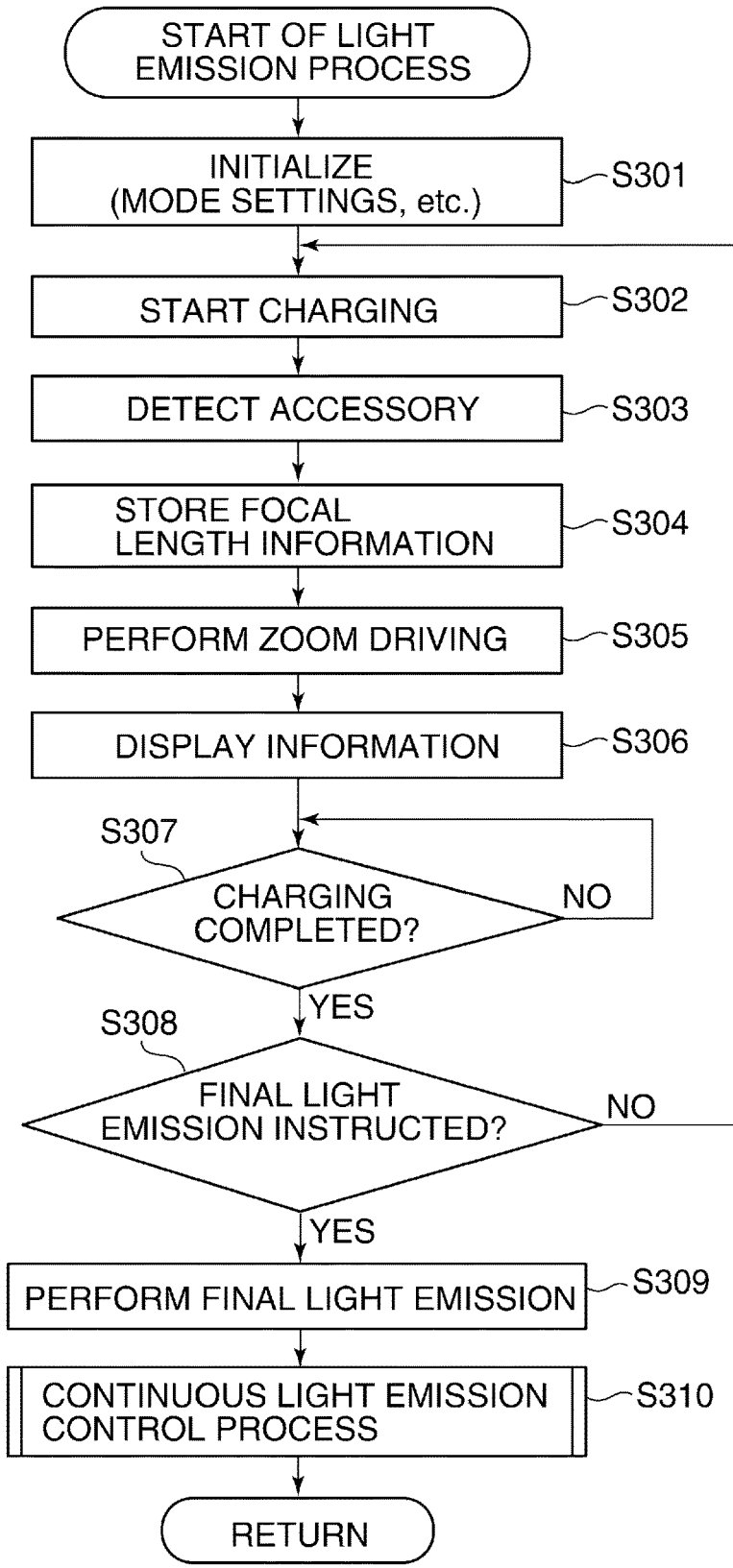
FIG. 3 is a flowchart of a light emission process performed by the strobe appearing in FIG. 1.

FIG. 3 is a flowchart of a light emission process performed by the strobe 300 appearing in FIG. 1.

When the power switch disposed on the input section 312 is turned on to make the strobe microcomputer 310 operable, the strobe microcomputer 310 starts the light emission process in FIG. 3.

First, the strobe microcomputer 310 initializes a memory and a port provided in the strobe microcomputer 310 (step S301). At this time, the strobe microcomputer 310 reads the states of the switches provided on the input section 312 and input information set in advance, to thereby make settings of a light emission mode, including a method of determining the light emission amount and light emission timing.

Then, the strobe microcomputer 310 controls the boosting circuit 302 to start charging of the main capacitor 302d (step S302). After charging of the main capacitor 302d is started, the strobe microcomputer 310 stores accessory detection information output from the accessory detection unit 370 in an internal memory (step S303). In a case where the accessory detection information has been stored before, the strobe microcomputer 310 updates the accessory detection information.

The strobe microcomputer 310 stores focal length information obtained from the camera microcomputer 101 via the communication line SC in the internal memory (step S304). In a case where the focal length information has been stored before, the strobe microcomputer 310 updates the focal length information.

The strobe microcomputer 310 controls the zoom driving circuit 330 to move the reflection umbrella unit 306a such that the light distribution angle of the strobe light is within a range dependent on the focal length information (step S305). In a case where it is unnecessary to move the reflection umbrella unit 306a, the step S305 is omitted. Then, the strobe microcomputer 310 displays information concerning the light emission mode set from the input section 312 and the focal length information, on the display section 313 (step S306).

The strobe microcomputer 310 determines whether or not charging of the main capacitor 302d is completed (step S307). If charging is not completed (NO to the step S307), the strobe microcomputer 310 remains on standby. On the other hand, if the charging is completed, the strobe microcomputer 310 transmits a charge completion signal to the camera microcomputer 101, and proceeds to a step S308.

The strobe microcomputer 310 determines whether or not a final light emission start signal as a final light emission instruction has been received from the camera microcomputer 101 (step S308). If the final light emission start signal has not been received (NO to the step S308), the strobe microcomputer 310 returns to the step S302. On the other hand, if the final light emission start signal has been received (YES to the step S308), the strobe microcomputer 310 controls the light emission control circuit 304 to cause the discharge tube 305 to perform the final light emission in response to the final light emission start signal (step S309). After performing the final light emission, the strobe microcomputer 310 stores information concerning the light emission, including the voltage of the main capacitor 302d, in the internal memory, and proceeds to a continuous light emission control process in a step S310.

The strobe microcomputer 310 starts the continuous light emission control process, as processing for suppressing temperature rise of the strobe 300, so as to control light emission and charging such that temperature of the strobe 300 does not rise too high e.g. due to continuous light emission (step S310). The continuous light emission control will be described hereinafter.

The continuous light emission control process is performed when a state of the strobe 300 has changed from an initial state, and is terminated when the same returns to the initial state. Here, as the state of the strobe 300, the strobe microcomputer 310 estimates the temperature of a target site where it is necessary to take into account an influence of heat generated by light emission. Then, the strobe microcomputer 310 determines the estimated temperature of the target site or starts counting of a counter, which is used as a substitute for the estimated temperature, starting with a first light emission. Then, the strobe microcomputer 310 performs the continuous light emission control process in parallel with the light emission process in FIG. 3 until the estimated temperature becomes equal to a temperature corresponding to the initial state or until the counter is reset. Note that the continuous light emission control process is similarly performed for single light emission. After the continuous light emission control has been started, the strobe microcomputer 310 causes the light emission process to return to the step S302.

Figure 4:
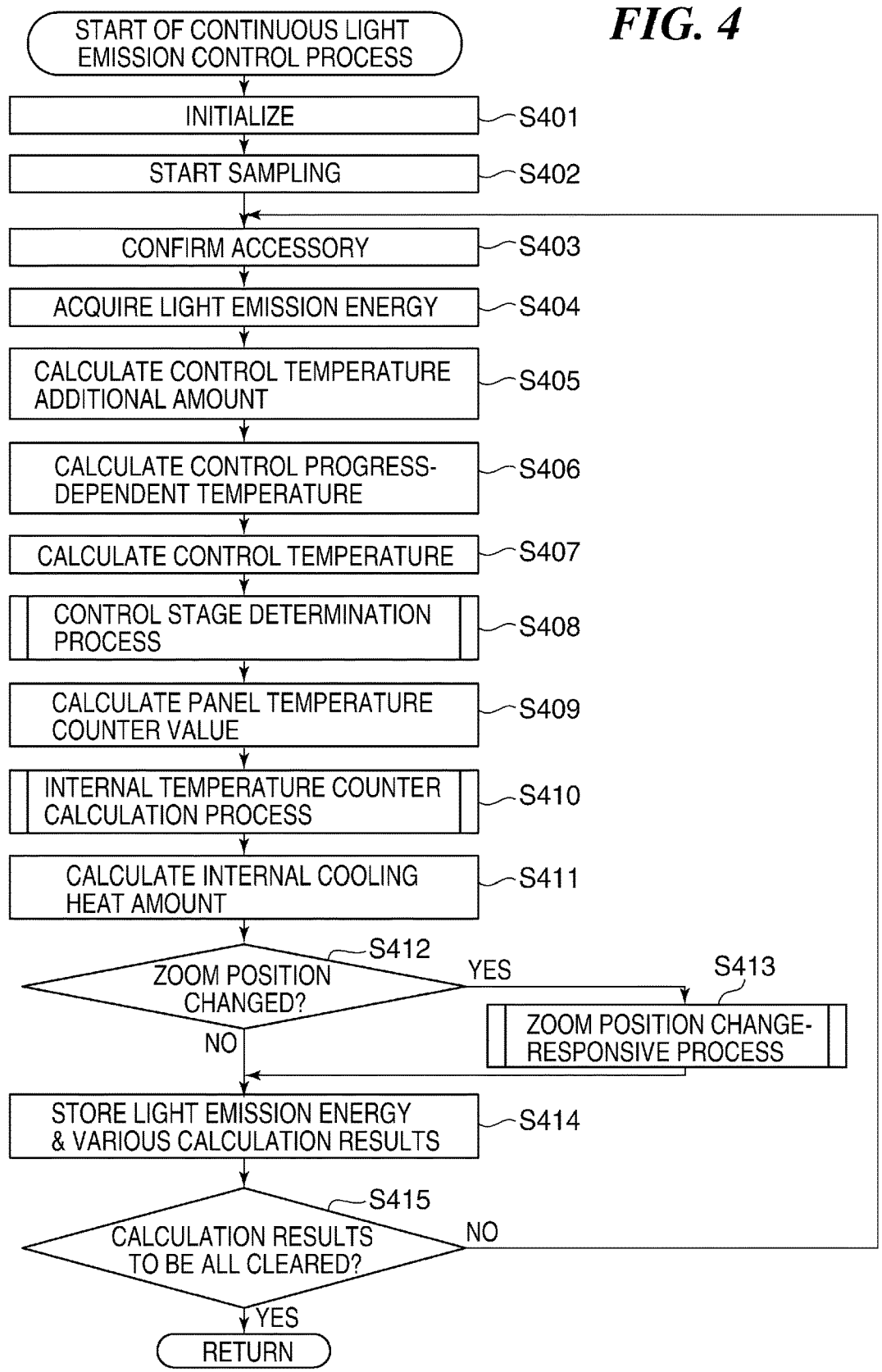
FIG. 4 is a flowchart of a continuous light emission control process performed in a step in FIG. 3.

FIG. 4 is a flowchart of the continuous light emission control process performed in the step S310 in FIG. 3. In the continuous light emission control process, the strobe microcomputer 310 estimates (i.e. calculates) the temperature of the target site where it is necessary to take into account an influence of heat generated by light emission. Then, the strobe microcomputer 310 controls a light emission interval, charging current, and so forth, based on the result of the calculation. Here, the description is given by regarding the optical panel 307 as the target site. This is because there is a possibility that optical characteristics of the optical panel 307 are changed by a sudden temperature rise.

As described above, when the strobe is caused to emit light, the strobe microcomputer 310 starts the continuous light emission control process in FIG. 4 in parallel with the light emission process described with reference to FIG. 3. First, the strobe microcomputer 310 initializes the settings concerning the continuous light emission control process (step S401). Then, the strobe microcomputer 310 reads the input information set in advance. In a case where the input information set in advance has been read in the step S301 in FIG. 3, the step S401 can be omitted.

Then, the strobe microcomputer 310 starts sampling for performing the continuous light emission control (step S402). Here, the strobe microcomputer 310 detects light emission at a predetermined sampling time, and performs calculation, described hereinafter, for each sampling time. The following description is given of the calculation for one sampling. Then, the calculation continues to be performed at each sampling until the result of calculation becomes equal to a temperature corresponding to the initial state of the target site or until the counter is reset.

Note that the sampling time is desirable to be set to a time period not longer than the shortest charging time required for full light emission of the strobe 300. For example, assuming that it takes 0.8 seconds to complete charging after full light emission (the charging time is 0.8 seconds), the sampling time is set to 0.5 seconds. In this case, one light emission is performed during one sampling time in the case of full light emission in which the largest amount of heat is generated, and hence it is easy to determine parameters used for the calculation. When the charging time is reduced due to connection of an external power supply unit, the sampling time may be set to a time period not longer than a reduced time period during which the charging can be completed.

Further, even in a case where the charging time is long, the sampling time is desirable not to be set to a too long time period. If the sampling time is set to a longer time period, although a degree of sensitivity of a calculation result can be reduced, it takes more time to perform determination on the calculation result, described hereinafter, due to the sampling time made longer. As a result, in a case where a change in the display is caused by control performed after light emission, the change in the display is more retarded from the light emission, which tends to cause the user to feel a strangeness.

Then, the strobe microcomputer 310 reads the accessory detection information stored in the step S303 in FIG. 3, and confirms whether the optical accessory 500 has been attached to the strobe 300 (step S403). At this time, the strobe microcomputer 310 also confirms the type of the optical accessory 500 attached to the strobe 300 (accessory information), and reads the parameters for calculation, associated with the confirmed type, from the internal memory. If the optical accessory 500 has not been attached to the strobe 300, the step S403 may be omitted. The strobe microcomputer 310 stores the accessory information in the internal memory, and then proceeds to a step S404.

Next, the strobe microcomputer 310 acquires a light emission energy NL of light emission occurring within one sampling time (step S404). For example, the strobe microcomputer 310 calculates the light emission energy NL based on the voltage of the main capacitor 302d, an integrated value of the light emission amount, obtained from the photodiode 314, or a light emission command from the camera body 100.

First, a description will be given of the case where the light emission energy is calculated based on the voltage of the main capacitor 302d.

Assuming that a voltage of the main capacitor 302d before light emission is represented by bVCM, and a voltage of the same after light emission is represented by aVCM, an energy EC is calculated based on a difference between the squares of the voltages before and after light emission by the following equation (1):

$$EC=(bVCM^2-aVCM^2)/Os \qquad (1)$$

More specifically, in the above equation, the strobe microcomputer 310 obtains the before-light-emission voltage bVCM and the after-light-emission voltage aVCM from A/D converted values of respective voltages of the main capacitor 302d. Further, the strobe microcomputer 310 adjusts a gain Os in accordance with an output range used in calculations for continuous light emission control, described hereinafter.

Next, the strobe microcomputer 310 calculates the light emission energy NL by converting the energy EC by the following approximate equation (2):

$$NL=\alpha \times EC+\beta \qquad (2)$$

A coefficient $\alpha$ and a variable $\beta$ are each different depending e.g. on the configuration of the strobe 300, and are adjusted based on measured data obtained in advance.

Next, a description will be given of the case where the light emission energy NL is calculated based on the integrated value of the light emission amount, obtained from the photodiode 314.

The strobe microcomputer 310 calculates the energy EC based on the integrated value, represented by AL, of the light emission amount obtained after light emission by the following equation (3):

$$EC=AL/Os \quad (3)$$

That is, the strobe microcomputer 310 calculates the energy EC as an approximate energy by adjusting the gain Os in accordance with the aforementioned output range.

After that, similar to the case where the light emission energy NL is calculated based on the voltage of the main capacitor 302d, the strobe microcomputer 310 calculates the light emission energy NL by the equation (2). Note that a conversion table defining a relationship between the integrated value AL of the light emission amount and the light emission energy NL may be stored e.g. in the EEPROM, and the light emission energy NL may be determined using the conversion table.

In the case where the light emission energy NL is calculated based on a light emission command sent from the camera body 100, the energy EC is calculated as an approximate energy by adjusting the gain Os in accordance with the aforementioned output range.

Assuming that the light emission command sent from the camera body 100 is represented by E, the energy EC is calculated by the following equation (4):

$$EC=E/Os \quad (4)$$

Then, similar to the case where the light emission energy NL is calculated based on the voltage of the main capacitor 302d, the strobe microcomputer 310 calculates the light emission energy NL by the equation (2). Note that a conversion table defining a relationship between the light emission command E and the light emission energy NL may be stored e.g. in the EEPROM, and the light emission energy NL may be determined using the conversion table.

In a case where a plurality of times of light emission, such as minute light emission, are performed within one sampling time, the light emission energy NL is calculated as a total of values of the light emission energy NL calculated for the plurality of times of light emission. Assuming that the values of the light emission energy calculated for the plurality of times of light emission are represented by NL1, NL2, ..., and NLz, the total light emission energy NL is calculated by the following equation (5):

$$NL=NL1+NL2+NL3+\ldots+NLz \quad (5)$$

Although in the step S309 in FIG. 3, preliminary light emission is treated as the total of a series of light emission, in the calculation of the light emission energy NL, each light emission is treated as individual preliminary light emission, and values calculated for respective light emissions are added up by the equation (5). However, in a case where light emission is not performed during one sampling time, NL=0 is calculated. After calculating the light emission energy NL, the strobe microcomputer 310 stores the calculated light emission energy NL in the internal memory, and proceeds to a step S405.

Next, the strobe microcomputer 310 calculates a control temperature additional amount Tfu (step S405). The control temperature additional amount Tfu will be described hereinafter. After calculating the control temperature additional amount Tfu, the strobe microcomputer 310 stores the control temperature additional amount Tfu in the internal memory.

Then, the strobe microcomputer 310 calculates a control progress-dependent temperature Tfd (step S406). The control progress-dependent temperature Tfd will be described hereinafter. After calculating the control progress-dependent temperature Tfd, the strobe microcomputer 310 stores the control progress-dependent temperature Tfd in the internal memory.

Next, the strobe microcomputer 310 calculates a control temperature Tf (step S407). The control temperature Tf will be described hereinafter. After calculating the control temperature Tf, the strobe microcomputer 310 stores the control temperature Tf in the internal memory.

Then, the strobe microcomputer 310 performs a control stage determination process, described hereinafter (step S408). The control stage refers to a setting of the shortest light emission interval when performing continuous light emission. As the control stage is higher, the shortest light emission interval is made longer. As the shortest light emission interval is made longer, the timing at which light emission can be performed is more limited. In the control stage determination process, the control stage is determined by determining whether or not the control temperature Tf calculated in the step S407 is higher than a predetermined threshold value. Note that the charging current may be changed instead of setting the shortest light emission interval.

As the threshold value used in the control stage determination process, a plurality of values can be set for each zoom position. In this case, a threshold value table in which threshold values are associated with values of the temperature of the optical panel 307 and values of the temperature of the exterior of the light emission section 300b is stored in the EEPROM, and the threshold value is adjusted using the threshold value table. Further, when the control temperature Tf rises to causes the control stage to reach a warning stage which is a latter or higher one of the control stage, light emission can be limited while displaying a warning.

Note that when a bit for a zoom position change-responsive process is equal to 1, the step S408 is omitted. The bit for the zoom position change-responsive process will be described hereinafter. After performing the control stage determination process, the strobe microcomputer 310 stores a result of the determination in the internal memory.

Next, the strobe microcomputer 310 calculates a panel temperature counter value Cp (step S409). The panel temperature counter value Cp will be described hereinafter. After calculating the panel temperature counter value Cp, the strobe microcomputer 310 stores the result of the calculation in the internal memory.

Then, the strobe microcomputer 310 calculates an internal temperature counter calculation process for calculating an internal temperature counter value Ci (step S410). In a case where the optical accessory 500 is attached to the strobe 300, the strobe microcomputer 310 changes a gain v for the light emission energy NL e.g. according to the type of the optical accessory 500. This makes it possible to finely control the number of times of light emission allowed to be executed, the charging current, and so forth, to thereby protect the optical panel 307.

The internal temperature counter value Ci and the gain v will be described hereinafter. After calculating the internal temperature counter value Ci, the strobe microcomputer 310 stores the result of the calculation in the internal memory.

Next, the strobe microcomputer 310 calculates an internal cooling heat amount Fi (step S411). The internal cooling heat amount Fi will be described hereinafter. After calculating the internal cooling heat amount Fi, the strobe microcomputer 310 stores the result of the calculation in the internal memory.

Then, the strobe microcomputer 310 confirms the zoom position at the last light emission during one sampling time. Then, the strobe microcomputer 310 compares the zoom position detected during the preceding one sampling time and the current zoom position, and determines whether or not the zoom position has been changed (step S412). If the zoom position has been changed (YES to the step S412), the strobe microcomputer 310 performs a zoom position change-responsive process, described hereinafter (step S413). After that, the strobe microcomputer 310 stores the result of the zoom position change-responsive process in the internal memory, and proceeds to a step S414. If there is no change in the zoom position (NO to the step S412), the strobe microcomputer 310 proceeds to the step S414.

The strobe microcomputer 310 stores the light emission energy NL and the results of the above calculations in the internal memory (step S414), and makes the stored values available for the next calculation. In a case where the results of the calculation have already been stored, the step S414 is omitted. If there is no change in zoom position (NO to the step S412), the strobe microcomputer 310 changes the bit of the zoom position change-responsive process, described hereinafter, to 0, and proceeds to the step S414.

Then, the strobe microcomputer 310 determines whether or not the control temperature Tf and the other calculation results have returned to their initial states. That is, in this step, the strobe microcomputer 310 determines whether or not to clear all of the calculation results (step S415). If it is determined not to clear all of the calculation results (NO to the step S415), the strobe microcomputer 310 returns to the step S403, and performs the next sampling. On the other hand, if it is determined to clear all of the calculation results (YES to the step S415), i.e. if the control temperature Tf and the other calculation results have returned to their initial states, the strobe microcomputer 310 terminates the continuous light emission control.

Figure 5:
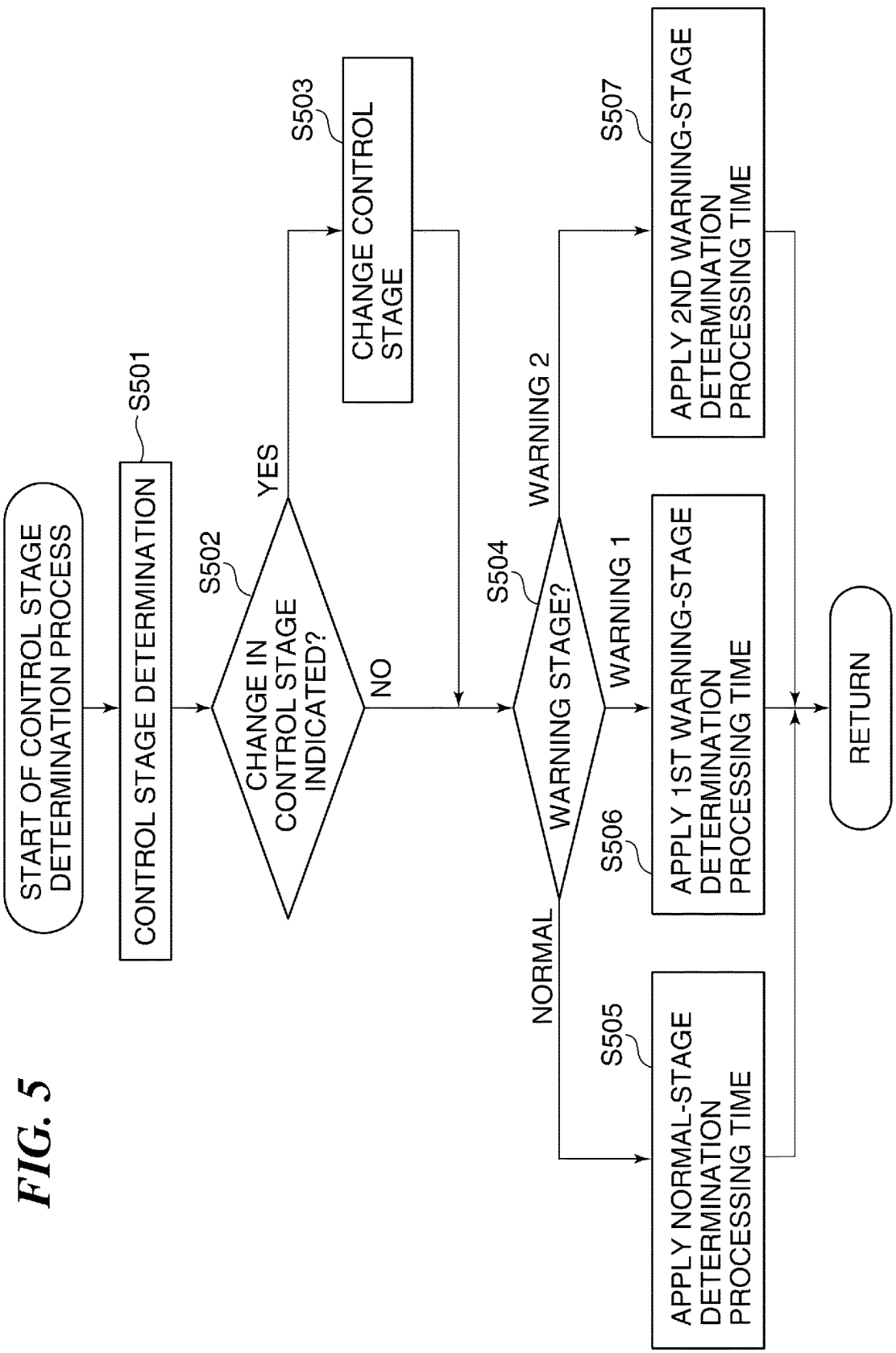
FIG. 5 is a flowchart of a control stage determination process performed in a step in FIG. 4.

FIG. 5 is a flowchart of the control stage determination process performed in the step S408 in FIG. 4.

When the control stage determination process is started, first, the strobe microcomputer 310 determines a control stage (step S501). In this determination of a control stage, the strobe microcomputer 310 determines whether or not the control temperature Tf is higher than a predetermined threshold value. If the control temperature Tf is higher than the predetermined threshold value, the strobe microcomputer 310 updates the result of the determination of the control stage to a new control stage.

Then, the strobe microcomputer 310 determines whether or not the result of the determination in the step S501 indicates a change in the control stage (step S502). If a change in the control stage is indicated (YES to the step S502), the strobe microcomputer 310 changes the control stage, and updates the associated parameters (step S503). After updating the parameters, the strobe microcomputer 310 stores the updated parameters in the internal memory. Then, the strobe microcomputer 310 determines whether or not the control stage is changed to a higher one to reach the warning stage (step S504). If no change in the control stage is indicated (NO to the step S502), the strobe microcomputer 310 directly proceeds to the step S504. Note that in the control stage determination process in FIG. 5, the warning stage is classified into two stages, for example.

If the control stage has not reached the warning stage ("normal" in the step S504), the strobe microcomputer 310 applies the sampling time for the determination process for the normal stage (normal-stage determination processing time) (step S505).

Note that the sampling time for the determination process refers to a sampling time at which the control stage determination process in the step S408 in FIG. 4, more specifically, the control stage determination in the step S501 of the present process in FIG. 5, is performed. Although in the normal time, it is desirable to synchronize sampling for the control stage determination process with sampling for the continuous light emission control process, timing of execution of sampling may be shifted from each other between the two processes so as to prevent e.g. chattering concerning the display. The same applies to the warning stage, but in a case where the sampling for the control stage determination process is not to be synchronized with sampling for the continuous light emission control process, if it is not the sampling time for the control stage determination process when the process proceeds to the step S408 in FIG. 4, this step is omitted. Alternatively, the continuous light emission control process in FIG. 4 and the control stage determination process in FIG. 5 may be performed in parallel, and the result of the control stage determination process (sampling time for the determination process) may be applied when the step S408 is executed. Further, in a case where there is no change in the sampling time for the determination process, this step may be omitted.

After applying the sampling time for the determination process for the normal stage, the strobe microcomputer 310 stores the result in the internal memory, followed by terminating the control stage determination process. In the case where the control stage determination process is performed in parallel with the continuous light emission control process, the strobe microcomputer 310 returns to the step S501.

When the control stage reaches the first warning stage ("warning 1" in the step S504), the strobe microcomputer 310 applies the sampling time for the determination process for the first warning stage (first warning-stage determination processing time) (step S506). Differently from the normal time, in the warning stage, it is desirable to set an interval of the sampling time to a longer time period than that in the continuous light emission control. That is, the warning display is performed in the warning stage, and hence if the display is changed at the same period as the continuous light emission control, a chattering-like phenomenon occurs on the display, which makes it difficult for a user to view the display. Therefore, by setting the interval of the sampling time in the warning stage to a longer time period so as to prevent the display from being changed with more than a predetermined frequency, the above-mentioned inconvenience is eliminated.

Further, in the warning stage, from the viewpoint of protection of the strobe 300, limitation of light emission, including inhibition of light emission, is executed so as to prevent the light emission interval from becoming shorter than a first predetermined interval. When the control stage enters the warning stage, the strobe 300 is in a state in which the temperature of the optical panel 307 and the temperature of the exterior of the light emission section 300b have been raised by repetition of light emission. For this reason, a warning is displayed to advise the user to promote heat dissipation from the strobe 300, and while making the sampling time in the warning stage longer, light emission is allowed only at an interval not shorter than the first predetermined interval. If there is no change in the sampling time for the determination process, this step may be omitted.

After applying the sampling time for the determination process for the first warning stage, the strobe microcomputer 310 stores the result in the internal memory, followed by terminating the control stage determination process. In the case where the control stage determination process is performed in parallel with the continuous light emission control process, the strobe microcomputer 310 returns to the step S501.

When the control stage reaches the second warning stage ("warning 2" in the step S504), the strobe microcomputer 310 applies the sampling time for the determination process for the second warning stage (second warning-stage determination processing time) (step S507). Although processing in the second warning stage is the same as that in the first warning stage, the warning display is changed, and limitation including inhibition of light emission is set so as to prevent the light emission interval from becoming shorter than a second predetermined interval which is longer than the first predetermined interval. When the user desires to further suppress rises in the temperature of the optical panel 307 and the temperature of the exterior, the sampling time in the second warning stage may be set to be longer than the sampling time in the first warning stage. Further, if there is no change in the sampling time for the determination process, this step may be omitted.

After applying the sampling time for the determination process for the second warning stage, the strobe microcomputer 310 stores the result in the internal memory, followed by terminating the control stage determination process. In the case where the control stage determination process is performed in parallel with the continuous light emission control process, the strobe microcomputer 310 returns to the step S501.

Next, a description will be given of how equations are derived which are used in the continuous light emission control performed by the strobe 300 appearing in FIG. 1.

Figure 6A:
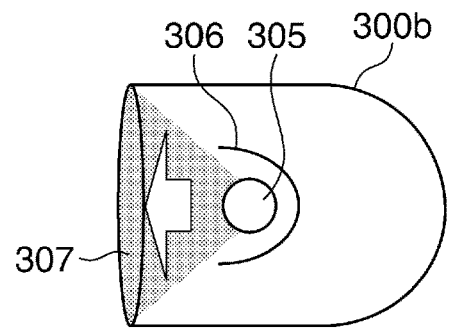
Figure 6B:
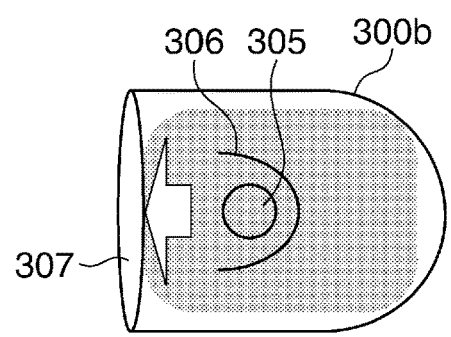
Figure 6C:
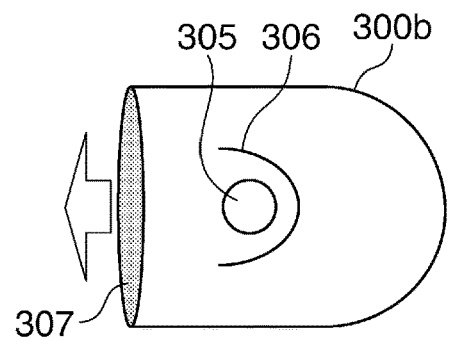

FIGS. 6A to 6C are views useful in explaining an example of a model simulating heat transfer to the optical panel 307 appearing in FIG. 1, in which FIG. 6A shows heat radiation to the optical panel 307 during light emission from the discharge tube 305, FIG. 6B shows heat transfer from the inner space of the light emission section 300b to the optical panel 307 after light emission from the discharge tube 305, and FIG. 6C shows heat transfer from the optical panel 307 to the outer space after light emission from the discharge tube 305.

Referring to FIG. 6A, the optical panel 307 is heated by heat radiation when the discharge tube 305 has emitted light. Assuming that this heat amount is referred to as a radiation heat amount Rh, the radiation heat amount Rh is calculated using the above-mentioned light emission energy NL by the following equation (6):

$$Rh = NL/Rhc \qquad (6)$$

wherein Rhc represents a radiation heat coefficient.

The optical panel 307 is affected by a different amount of heat which varies with each zoom position. For this reason, the radiation heat coefficient Rhc is set on a zoom position-by-zoom position basis, whereby the radiation heat amount Rh is calculated on a zoom position basis.

Referring to FIG. 6B, after the light emission from the discharge tube 305, heat transfer from the warmed inner space of the light emission section 300b to the optical panel 307 occurs with a time difference from the above-mentioned heat radiation. Assuming that this heat transfer heat amount is represented by Hh, the heat transfer heat amount Hh is calculated by the following equation (7):

$$Hh = (preCi - preCp)/Hhc \qquad (7)$$

wherein Ci represents the internal temperature counter value (count), Cp represents the panel temperature counter value, "pre" indicates that a symbol prefixed with this element represents a result of calculation, obtained in one of the preceding sampling times, and Hhc represents a heat transfer coefficient used when heat in the inner space of the light emission section 300b is transferred to the optical panel 307.

Referring to FIG. 6C, the optical panel 307 is exposed to the outside air, and hence heat dissipation is performed. Assuming that an amount of heat dissipated to the outside is referred to as a panel dissipated heat amount Fp, the panel dissipated heat amount Fp is calculated by the following equation (8):

$$Fp = (preCp - preT)/Fhc \qquad (8)$$

wherein T represents an environmental temperature or a counter value (count) used as a substitute for the environmental temperature, and Fhc represents a heat transfer coefficient used when heat is transferred from the optical panel 307 to the outside.

Although in addition to heat transfer of which the models are shown in FIGS. 6A to 6C, there also occurs heat transfer from the exterior of the light emission section 300b to the optical panel 307 occurs, a contact area between the two is small, and hence heat transfer therebetween is sufficiently small compared with heat transfer occurring when light is emitted from the discharge tube 3305, and hence description thereof is omitted.

Here, the internal temperature counter value Ci included in the above equation (7) is calculated.

Figure 7A:
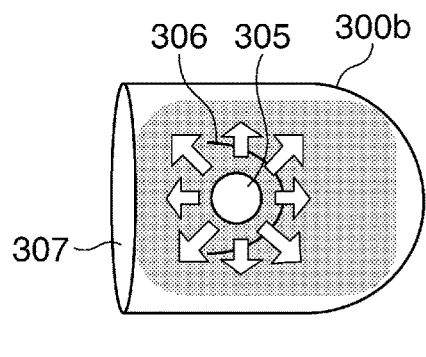
Figure 7B:
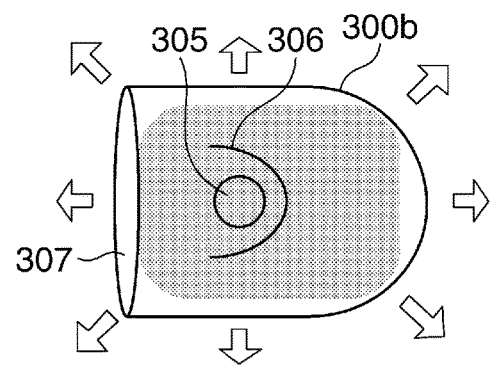

FIGS. 7A and 7B are views useful in explaining a model simulating heat transfer caused by light emission from the inner space of the light emission section 300b, in which FIG. 7A shows heat transfer to the inner space of the light emission section 300b when the discharge tube 305 emits light, and FIG. 7B shows heat transfer when heat is dissipated from the inner space of the light emission section 300b to the outer space via the exterior.

Referring to FIG. 7A, the inner space of the optical panel 307 is heated by heat transferred when the discharge tube 305 has emitted light. Assuming that this heat amount is referred to as a heat amount Hv, the heat amount Hv is calculated using the light emission energy NL by the following equation (9):

$$Hv = NL/Cic \qquad (9)$$

wherein Cic represents an internal temperature coefficient, which is a conversion coefficient for use in converting the light emission energy NL to the heat amount Hv.

Referring to FIG. 7B, heat is dissipated from the heated inner space of the light emission section 300b. Assuming that an amount of heat dissipated to the outer space via the exterior is referred to as an internal cooling heat amount Fi, the internal cooling heat amount Fi is calculated by the following equation (10):

$$Fi = (preCi - preT)/Fic \qquad (10)$$

wherein Fic represents an internal cooling coefficient.

The internal temperature counter value Ci is the sum of the internal temperature counter value preCi obtained in the preceding sampling, the heat amount Hv obtained in the preceding sampling, and the internal cooling heat amount Fi obtained in the preceding sampling. Therefore, the internal temperature counter value Ci is calculated by the following equation (11):

$$Ci=preCi+preHv-preFi \quad (11)$$

The panel temperature counter value Cp is the sum of the panel temperature counter preCp obtained in the preceding sampling, the radiation heat amount Rh, the heat transfer heat amount Hh, and the panel dissipated heat amount Fp. Therefore, the panel temperature counter value Cp is calculated by the following equation (12):

$$Cp=preCp+Rh+Hh-Fp \quad (12)$$

Then, an estimated panel temperature is calculated using the panel temperature counter value Cp calculated by the equation (12) and the environmental temperature T. Assuming that the estimated panel temperature is represented by Tps, the estimated panel temperature Tps is calculated by the following equation (13):

$$Tps=T+Cp/Tc \quad (13)$$

wherein Tc represents a temperature conversion coefficient.

From the equation (13), only if the environmental temperature T is known, it is possible to calculate the temperature of the optical panel 307 at the time.

Figure 8:
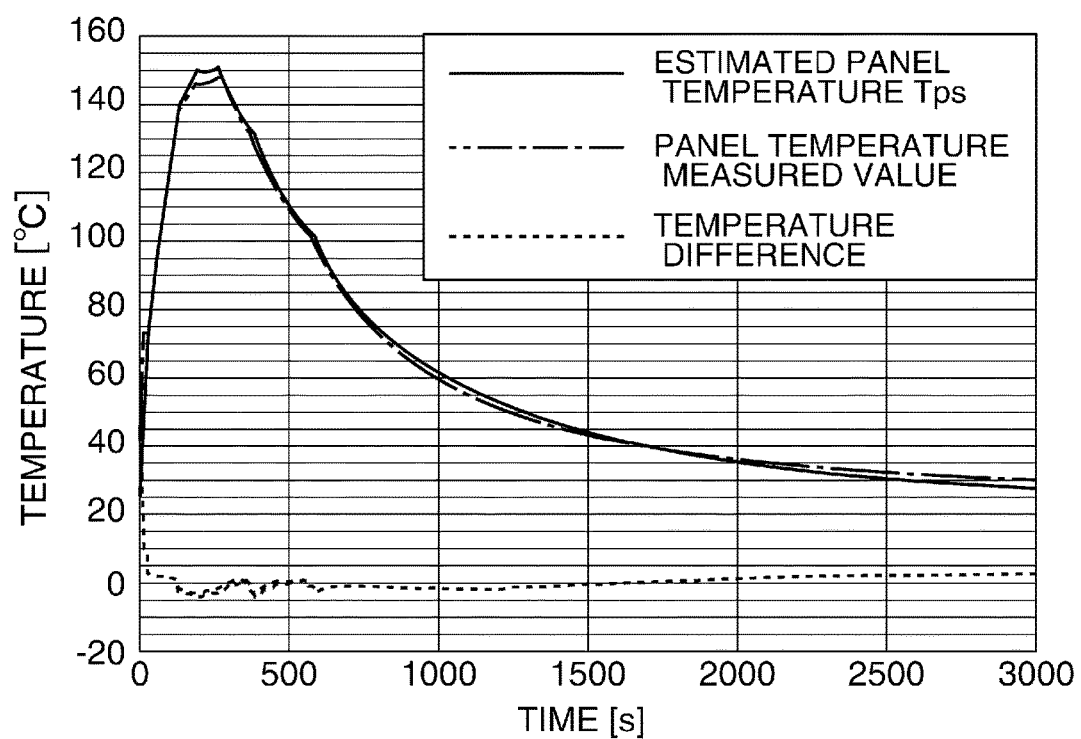
FIG. 8 is a diagram showing an actually measured value of the temperature of the optical panel, a calculation result obtained by using an equation, and a difference between the actually measured value and the calculation result.

FIG. 8 is a diagram showing an actually measured value of the temperature of the optical panel 307, a result of calculation by the equation (13), and a difference between the actually measured value and the result of the calculation.

Referring to FIG. 8, a horizontal axis represents a time which elapses from the start of light emission, and a vertical axis represents a surface temperature of the optical panel 307. FIG. 8 shows results obtained when light emission is repeated 130 times, at the environmental temperature T=23, by way of example.

However, hereafter, to simplify the control, calculation is performed assuming T=0.

To perform calculation for the continuous light emission control, when the equation (13) can be developed and arranged into the following equation (14):

$$Tf=NL/(Rhc \times Tc)+(1/Tc-2/(Hhc \times Tc)) \times preCp+preCi/(Hhc \times Tc) \quad (14)$$

(because Tf=Tps−T, Hhc=Fhc, T=0)

wherein Tf represents the control temperature, which is used in the control determination, described hereinafter.

Here, assuming that the first term of the right side of the equation (14) is referred to as a control temperature additional amount Tfu, and the second term and the third term of the right side of the same are referred to as a control progress-dependent temperature Tfd, it is possible to represent the control temperature additional amount Tfu, the control progress-dependent temperature Tfd, and the control temperature Tf, by the following equations (15):

$$\begin{cases} Tfu = NL/(Rhc \times Tc) \\ Tfd = (1/Tc - 2/(Hhc \times Tc)) \times preCp + preCi/(Hhc \times Tc) \\ Tf = Tfu + Tfd \end{cases} \quad (15)$$

The equation of the control temperature additional amount Tfu is related to heat radiation, for use in immediately adding an mount of heat heating the optical panel 307 by heat radiation in each sampling. The equation of the control progress-dependent temperature Tfd is related to the temperature of the optical panel 307 in the sampling, which is estimated from the result of the calculation in the preceding sampling. Further, the equation of the control progress-dependent temperature Tfd includes the panel temperature counter preCp in the preceding sampling and the internal temperature counter value preCi in the preceding sampling. Therefore, by taking into account an order of calculation in the continuous light emission control process described with reference to FIG. 4, it is possible to complete the calculations in one sampling by the following equations (16) to (18):

$$preCp=(1-2/Hhc) \times preCp+preCi/Hhc+NL/Rhc \quad (16)$$

$$preCi=preCi+preNL/Cic-preFi \quad (17)$$

$$preFi=preCi/Fic \quad (18)$$

By simplifying the coefficients for each zoom position with respect to the above equations (15) to (18), these equations can be expressed by the following equations (19):

$$\begin{cases} Tfu = NL \times \gamma \\ Tfd = preCp \times \delta + preCi \times \varepsilon \\ Tf = Tfu + Tfd \\ preCp = preCp \times \zeta + preCi \times \eta + NL \times \kappa \\ preCi = preCi \times \lambda + preNL \times \nu - preFi \times \xi \\ preFi = preCi \times \rho \end{cases} \quad (19)$$

The coefficients γ, δ, ε, ζ, η, κ, λ, ν, ξ, and ρ are each different depending e.g. on the material, the arrangement, and the space size of the strobe 300, and are adjusted based on measured data obtained by measurement performed in advance.

In the first equation and the fifth equation of the equations (19), the coefficients γ and ν are treated as gains associated with the light emission energy NL. The first equation of the equations (19) takes into account a momentary influence of heat radiation, and hence the result of the calculation is not fed back to the next sampling. On the other hand, by using the gain ν of the fifth equation, it is possible to adjust the gain by taking into account an influence of heat transfer indicated by the internal temperature counter value Ci, on the next sampling.

As described above, calculation is performed using the first equation of the equations (19) in the step S405, the second equation of the same in the step S406, and the third equation of the same in the step S407. Further, calculation is performed using the fourth equation of the equations (19) in the step S409, the fifth equation of the same in the step S410, and the sixth equation of the same in the step S411.

Further, it is understood that calculation by the fourth to sixth equations of the equations (19) is performed for feedback to the next sampling. This makes it possible to obtain an estimated temperature based on time over which heat is dissipated and the temperature difference e.g. between the optical panel 307 and the inner space of the light emission section 300b. For example, it is possible to draw a heat dissipation curve indicating that the panel dissipated heat amount Fp is large in a state in which the temperature of the optical panel 307 is high, and is small in a state in which the temperature of the same is low. This makes it possible to calculate the estimated temperature in accordance with changes in temperature, actually caused by a rise in temperature and heat dissipation. As shown in FIG. 8, the tendency of changes in the estimated panel temperature Tps, as a result of calculation, obtained by using the above equations, and the tendency of changes in the actually measured value of the temperature of the optical panel are analogous to each other, and there is no problem even if the estimated panel temperature Tps is used in place of the actually measured value of the temperature of the optical panel. As described above, in the present embodiment, it is possible to eliminate the need of a temperature sensor, and thereby reduce the costs.

Figure 9:
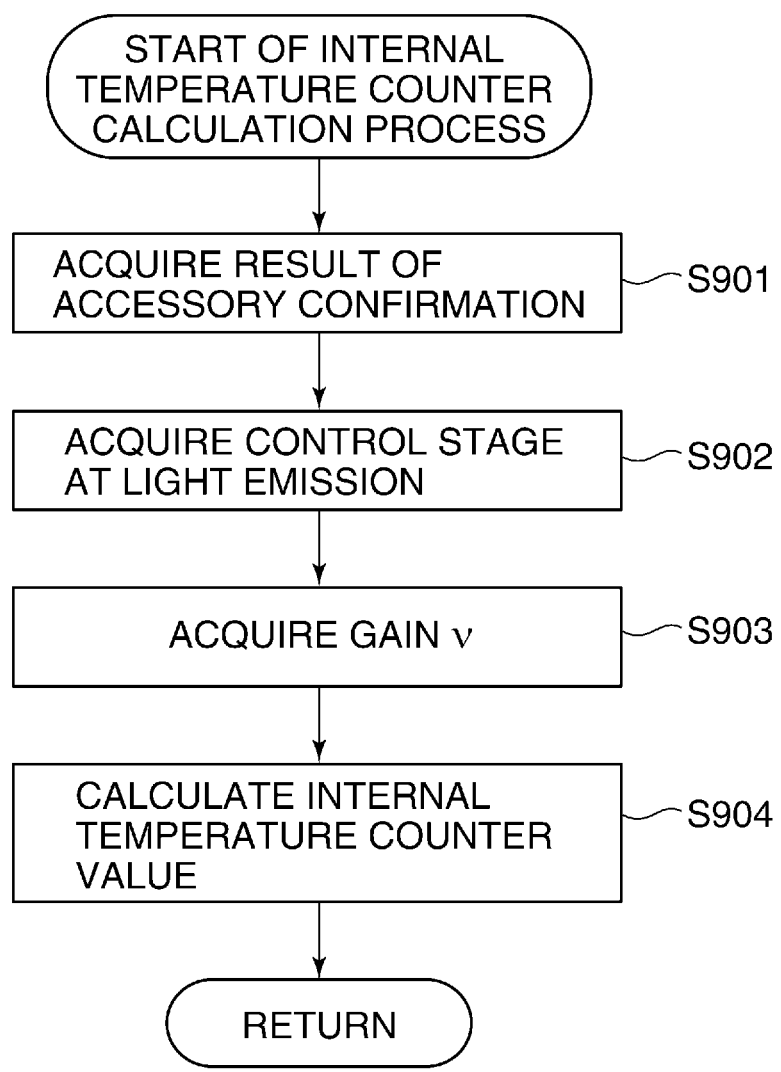
FIG. 9 is a flowchart of an internal temperature counter calculation process performed in a step in FIG. 4.

FIG. 9 is a flowchart of the internal temperature counter calculation process performed in the step S410 in FIG. 4.

When the internal temperature counter calculation process is started, the strobe microcomputer 310 acquires information concerning the optical accessory 500 (accessory confirmation result) confirmed in the step S403 in FIG. 4 (step S901). If it was impossible to confirm in the step S403 that the optical accessory 500 has been attached, the strobe microcomputer 310 acquires information to the effect that the optical accessory 500 is not attached. Then, the strobe microcomputer 310 stores the result of accessory confirmation in the internal memory.

Then, the strobe microcomputer 310 acquires information indicative of the control stage at the time of light emission (step S902). Then, the strobe microcomputer 310 stores the acquired control stage information in the internal memory. The strobe microcomputer 310 acquires the gain v based on the result of accessory confirmation and the control stage information (step S903).

FIG. 10 is a diagram showing an example of the gain v of the internal temperature counter. Here, it is assumed that the strobe microcomputer 310 has a table concerning the gain v, shown in FIG. 10.

FIG. 10 shows the gain v for the normal state of the strobe 300 in which the optical accessory 500 is not attached, and respective states of the strobe 300 in which color filters CF1 and CF2, and a bounce adapter BA are each attached singly or are attached in combination, as the optical accessory 500. Note that each of the color filters CF1 and CF2, and the bounce adapter BA can be attached at the same time in combination.

Figure 11A:
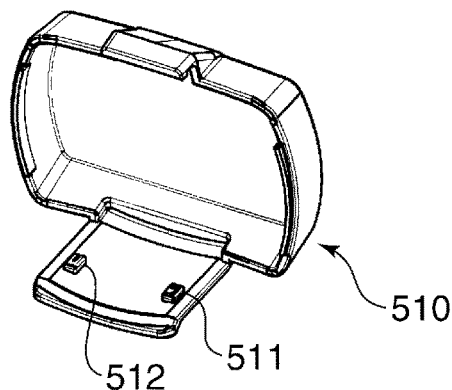
Figure 11B:
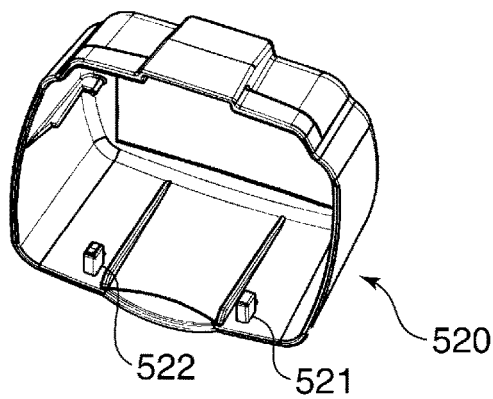
Figure 11C:
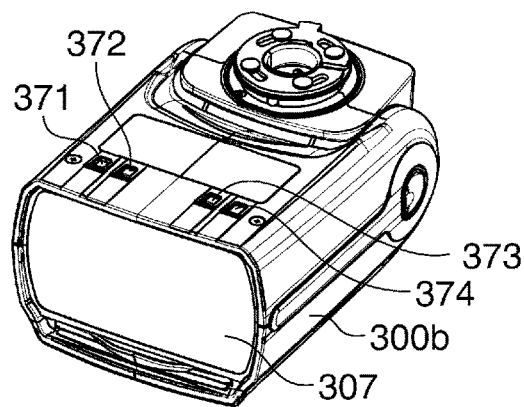
Figure 11D:
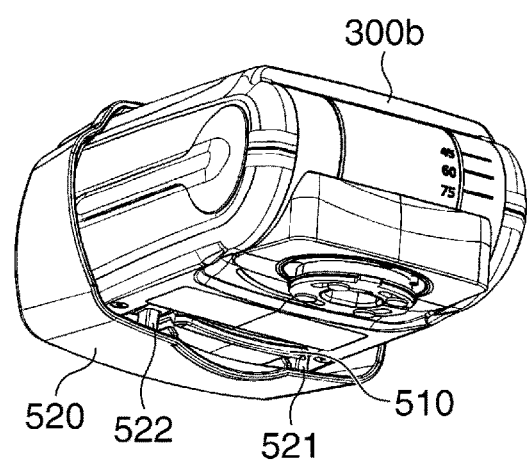

FIGS. 11A to 11D are views useful in explaining how the optical accessory 500 is attached to the light emission section 300b appearing in FIG. 1, in which FIG. 11A shows the color filter, denoted by reference numeral 510, (note that the color filters CF1 and CF2 are different only in color for adjustment) as the optical accessory 510, FIG. 11B shows a bounce adapter 520 as the optical accessory 500, FIG. 11C shows the accessory detection unit 370 disposed at the bottom of the light emission section 300b, and FIG. 11D shows a state in which the color filter 510 and the bounce adapter 520 have been attached to the light emission section 300b.

Referring to FIG. 11A, the color filter 510 is formed with protrusions 511 and 512. When the color filter 510 is attached to the light emission section 300b, the accessory detection unit 370 is pressed by a tip portion formed on either of the protrusion 511 or the protrusion 512. This enables the accessory detection unit 370 to detect attachment of the color filter 510 to the light emission section 300b. The accessory detection unit 370 is capable of discriminating a color for adjustment of the color filter 510 depending on whether the detected tip portion belongs to the protrusion 511 or the protrusion 512. If the detected tip portion is formed on the protrusion 511, it presses a switch 373 of the accessory detection unit 370, whereas if the detected tip portion is formed on the protrusion 512, it presses a switch 372 of the accessory detection unit 370, whereby each of respective different colors for adjustment is determined (see FIG. 11C).

Referring to FIG. 11B, similarly, the bounce adapter 520 is formed with protrusions 521 and 522. When the bounce adapter 520 is attached to the light emission section 300b, the accessory detection unit 370 is pressed by a tip portion formed on either of the protrusions 521 and 522. This enables the accessory detection unit 370 to detect attachment of the bounce adapter 520 to the light emission section 300b.

In the illustrated example, one type of the bounce adapter 520 is shown, and the protrusion 522 presses a switch 371, whereby attachment of the bounce adapter is detected (see FIG. 11C). In this case, the protrusion 521 and a switch 374 are used as a holding portion. The color filters 510 and the bounce adapters 520 are individually associated with the switches 371 to 373, respectively. This makes it possible to attach the color filter 510 and the bounce adapter 520 in combination, as shown in FIG. 11D.

The following description is given assuming that the two types of color filters 510 which are different in tone are referred to as CF1 and CF2, and the bounce adapter 520 is referred to as BA.

In FIG. 10, the gain v is increased to protect the optical panel 307 in a first stage of the control stage, in which light emission is performed at short light emission intervals in the normal time, and in a first stage of the warning stage (first warning stage) and a second stage of the warning stage (second warning stage), in which the temperature of the optical panel 307 has risen. On the other hand, in a state in which the CF1 is attached, the optical panel 307 is in a state difficult to dissipate heat therefrom, and hence the gain v is made larger than in the normal time. By doing this, protection of the optical panel 307 is performed as if the light emission energy NL were made larger.

For example, as shown in FIG. 10, in a case where the CF1 is attached, the gain v in the third stage and the fifth stage is increased from 1 to 2. In a case where the CF2 or the BA is attached, the gain v is similarly set in accordance with the heat dissipation characteristics of each accessory, whereby it is possible to represent an apparent increase in temperature. Further, in a case where both of the CF1 and the BA are attached (CF1+BA), the larger gain v setting of the respective control stages of the optical accessories 500 to be combined is used. Further, the gain v may be individually set, as in the case of the gain for the combination of the CF2 and the BA (CF2+BA).

As described above, the strobe microcomputer 310 acquires the gain v based on the information associated with the optical accessory 500, obtained in the step S901 in FIG. 9, stores the acquired gain v in the internal memory, and proceeds to a step S904.

In the step S904, the strobe microcomputer 310 calculates the internal temperature counter value Ci using the fifth equation of the equations (19). Then, the strobe microcomputer 310 stores the result of the calculation in the internal memory, and proceeds to the step S411 in FIG. 4.

As described above, by causing the heat generation to appear as if it were increased, it is possible to rapidly increase the control temperature Tf. By doing this, for example, when the accessory detection unit 370 detects whether or not the optical accessory 500 is attached, and the gain v is changed according to the result of the detection, it is possible to adjust the number of times of light emission allowed to be executed and the charging current of the strobe 300.

Further, since the accessory detection unit 370 can identify e.g. the type of the optical accessory 500, it is possible to change the gain v in according with a condition set for each type. As a consequence, even when the optical accessory 500 having low heat dissipation characteristics is attached, it is possible to operate the optical accessory 500 without damaging the optical panel 307 by changing the gain v.

Figure 12:
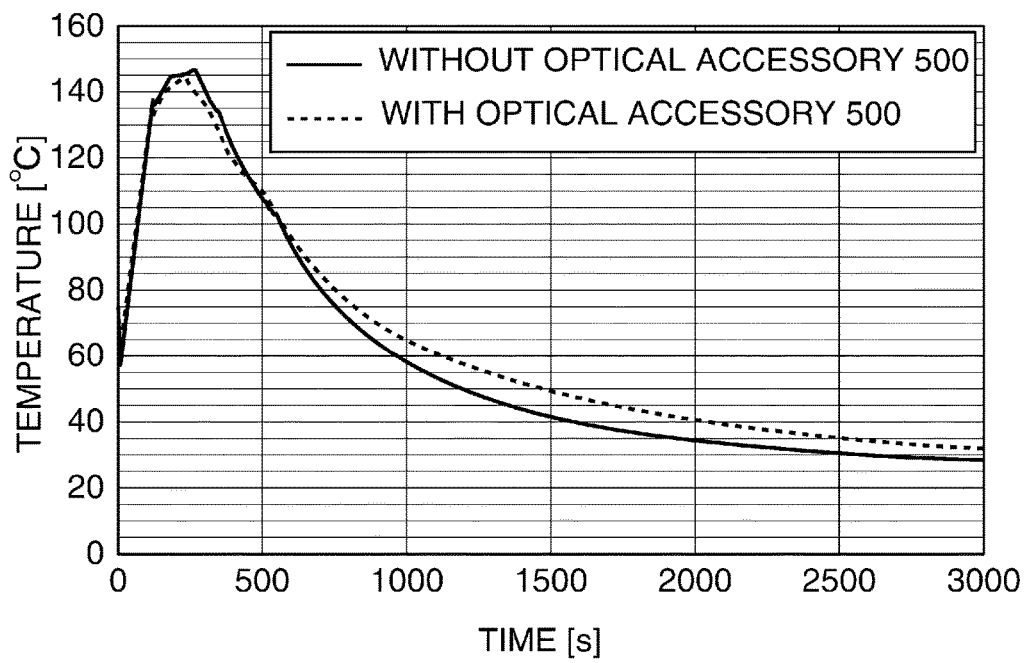
FIG. 12 is a diagram showing a difference in changes in the maximum temperature of the optical panel between states with and without the optical accessory attached to the strobe appearing in FIG. 1

FIG. 12 is a diagram showing a difference in changes in the maximum temperature of the optical panel 307 between states with and without the optical accessory 500 attached to the strobe 300 appearing in FIG. 1.

Referring to FIG. 12, a horizontal axis represents time which elapses from the start of light emission, and a vertical axis represents the surface temperature of the optical panel 307. A solid line described as "without the optical accessory 500" represents changes in the temperature of the optical panel 307 in a case where light is emitted from the discharge tube 305 130 times. Further, a broken line described as "with the optical accessory 500" represents changes in the temperature of the optical panel 307 in a case where light is emitted from the discharge tube 305 117 times. The temperature of the optical panel 307 "with the optical accessory 500" is difficult to lower during heat dissipation because the optical accessory 500 is attached in a manner covering the optical panel 307, and hence heat is difficult to be released from the optical panel 307.

As described above, it is understood that the number of times of continuous light emission is changed depending on whether or not the optical accessory 500 is attached, and as a result, in the case where the optical accessory 500 is attached, the maximum temperature of the optical panel 307 is suppressed to a temperature nearly equal to that in the normal time (without the optical accessory).

As described with reference to FIG. 10, since the gain v of the fifth equation of the equations (19) is changed for each control stage, it is possible to adjust the operation during a rapid increase in the temperature or in the warning stage, irrespective of whether or not the optical accessory 500 is attached. This makes it possible to prevent the temperature from rapidly increasing due to short light emission intervals in the first control stage or chattering concerning the display in the warning stage.

Figure 13:
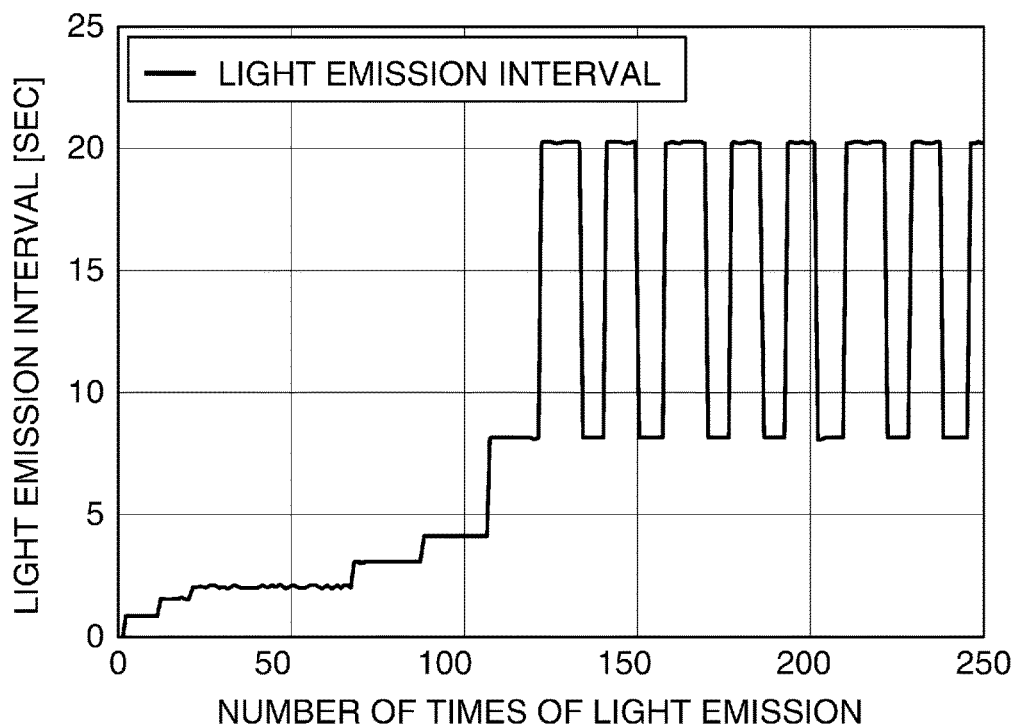
FIG. 13 is a diagram showing an example of operations performed by the strobe appearing in FIG. 1 in a warning stage, for preventing chattering on the display.

FIG. 13 is a diagram showing an example of an operation performed by the strobe 300 appearing in FIG. 1 in the warning stage for preventing chattering on the display.

Referring to FIG. 13, in the first warning stage, the light emission interval is approximately eight seconds, and in the second warning stage, the light emission interval is approximately 20 seconds. In general, when the temperature of the optical panel 307 is controlled, so-called chattering on the display occurs in the vicinity of a threshold value. However, assuming that the temperature of the optical panel 307 rises to cause the control stage to reach the second warning stage, as shown in FIG. 13, it is possible, in this case, to perform an operation for shifting the control stage from the second warning stage to the first warning stage when the temperature of the optical panel 307 is lowered to some degree, by setting the sampling time for the determination process and the gain v.

Further, in a case where the temperature of the optical panel 307 has risen by continuous light emission, it is possible to perform an operation for shifting the control stage to the second warning stage again, whereby it is possible to prevent chattering on the display or the control.

Figure 14:
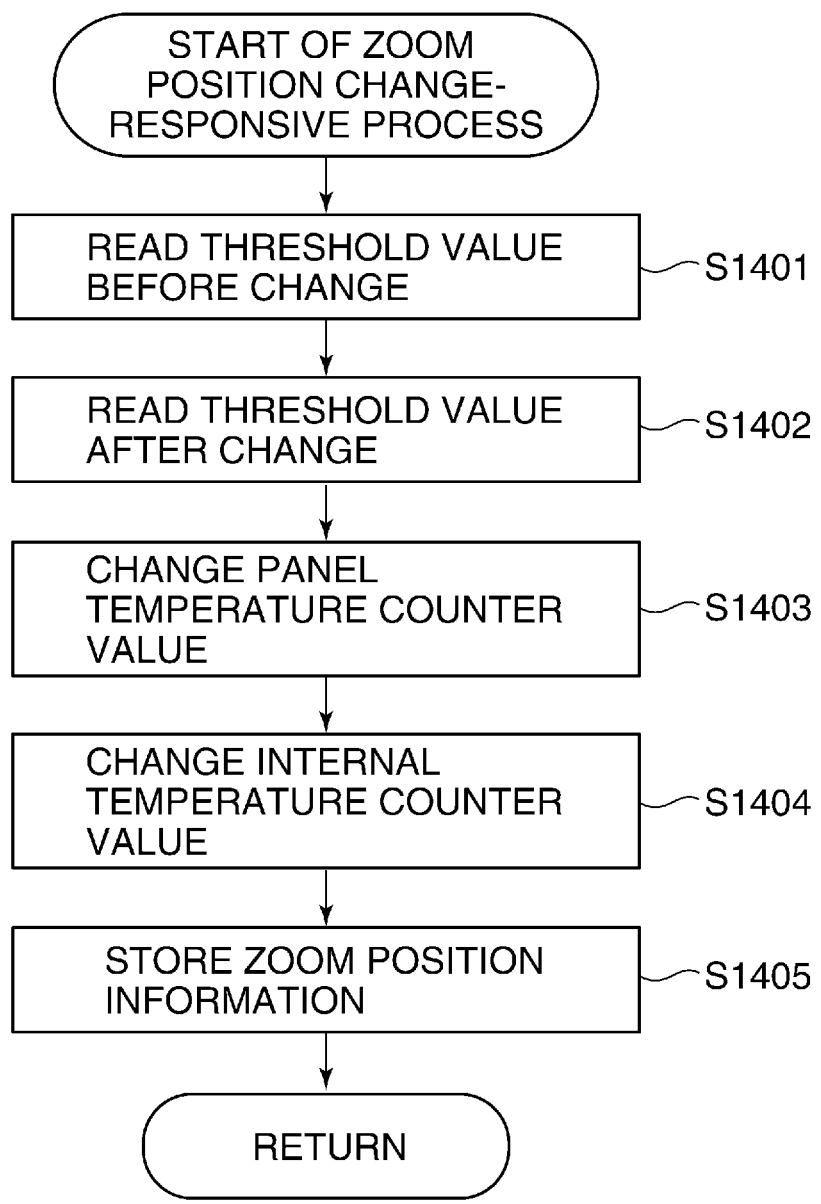
FIG. 14 is a flowchart of a zoom position change-responsive process performed in a step in FIG. 4.

FIG. 14 is a flowchart of the zoom position change-responsive process performed in the step S413 in FIG. 4.

When the zoom position change-responsive process is started, the strobe microcomputer 310 reads a reference threshold value of the control temperature Tf, which is associated with a control stage in a zoom position before changing the zoom position, from the internal memory (e.g. EEPROM) (step S1401). Although whether to use an upper limit value or a lower limit value of the reference threshold value depends on threshold values stored in the EEPROM, the lower limit value is used when the threshold value for the first stage of the control stage is set to 0. In this case, a threshold value for a stage upper than the control stage by one stage may be used.

Then, the strobe microcomputer 310 reads the reference threshold value of the control temperature Tf, which is associated with the control stage in a zoom position after changing the zoom position, from the internal memory (step S1402). Whether to use the upper limit value or the lower limit value of the reference threshold value is required to be the same as in the step S1401.

Next, the strobe microcomputer 310 performs processing for changing the panel temperature counter value Cp obtained in the step S409 in FIG. 4 (step S1403). This processing is performed because the range of the control stage is different in each zoom position. The changed panel temperature counter value preCp can be calculated using the fourth equation of the equations (19), with FPZ representing the threshold value before change, and FAZ representing the threshold value after change, by the following equation (20):

$$preCp = preCp \times FAZ/FPZ \qquad (20)$$

After the change, the strobe microcomputer 310 stores the changed panel temperature counter value preCp in the internal memory. Then, the strobe microcomputer 310 performs processing for changing the internal temperature counter value Ci obtained in the step S410 in the similar manner to the step S1403 (step S1404). The changed internal temperature counter value preCi can be calculated using the fifth equation of the equations (19), with FPZ representing the threshold value before the change, and FAZ representing the threshold value after the change, by the following equation (21):

$$preCi = preCi \times FAZ/FPZ \qquad (21)$$

After the change, the strobe microcomputer 310 stores the result of the changed internal temperature counter value preCi in the internal memory. Then, the strobe microcomputer 310 stores the results of the zoom position change-responsive process in the internal memory in association with the changed zoom position (step S1405), and makes the stored results available for the next sampling. After that, the strobe microcomputer 310 terminates the zoom position change-responsive process. At this time, the strobe microcomputer 310 adds a bit indicating that the zoom position has been changed. In a case where the bit has been added, the strobe microcomputer 310 does not perform the control stage determination process in the step S408 in FIG. 4. More specifically, since feedback is performed in the continuous light emission control, immediately after changing the zoom position, the control temperature Tf is calculated using the panel temperature counter value Cp and the internal temperature counter value Ci, which have been calculated for the preceding zoom position. If the control stage determination is performed in this state, there is a possibility that the control stage is temporarily shifted from the normal value, and hence the strobe microcomputer 310 does not perform the control stage determination process in the step S408.

As described above, in the first embodiment of the present invention, light emission is properly controlled by preventing an abnormal increase in the temperature irrespective of whether or not an optical accessory is attached, whereby it is possible to protect the protection site, such as the optical panel, from heat generated by light emission.

Next, a description will be given of a digital camera as an image pickup apparatus equipped with a strobe as a lighting device according to a second embodiment of the present invention. Note that the camera according to the second embodiment has the same configuration as the camera shown in FIGS. 1 and 2, and hence description thereof is omitted.

In the above-described first embodiment, light emission is controlled by calculating the light emission energy NL irrespective of the zoom position, and changing the threshold value for each zoom position. On the other hand, in the second embodiment, light emission is controlled by calculating the light emission energy NL while taking into account an influence of light emission on the optical panel 307, which is different depending on the zoom position, and using a common threshold value in an entire zoom range.

Figure 15:
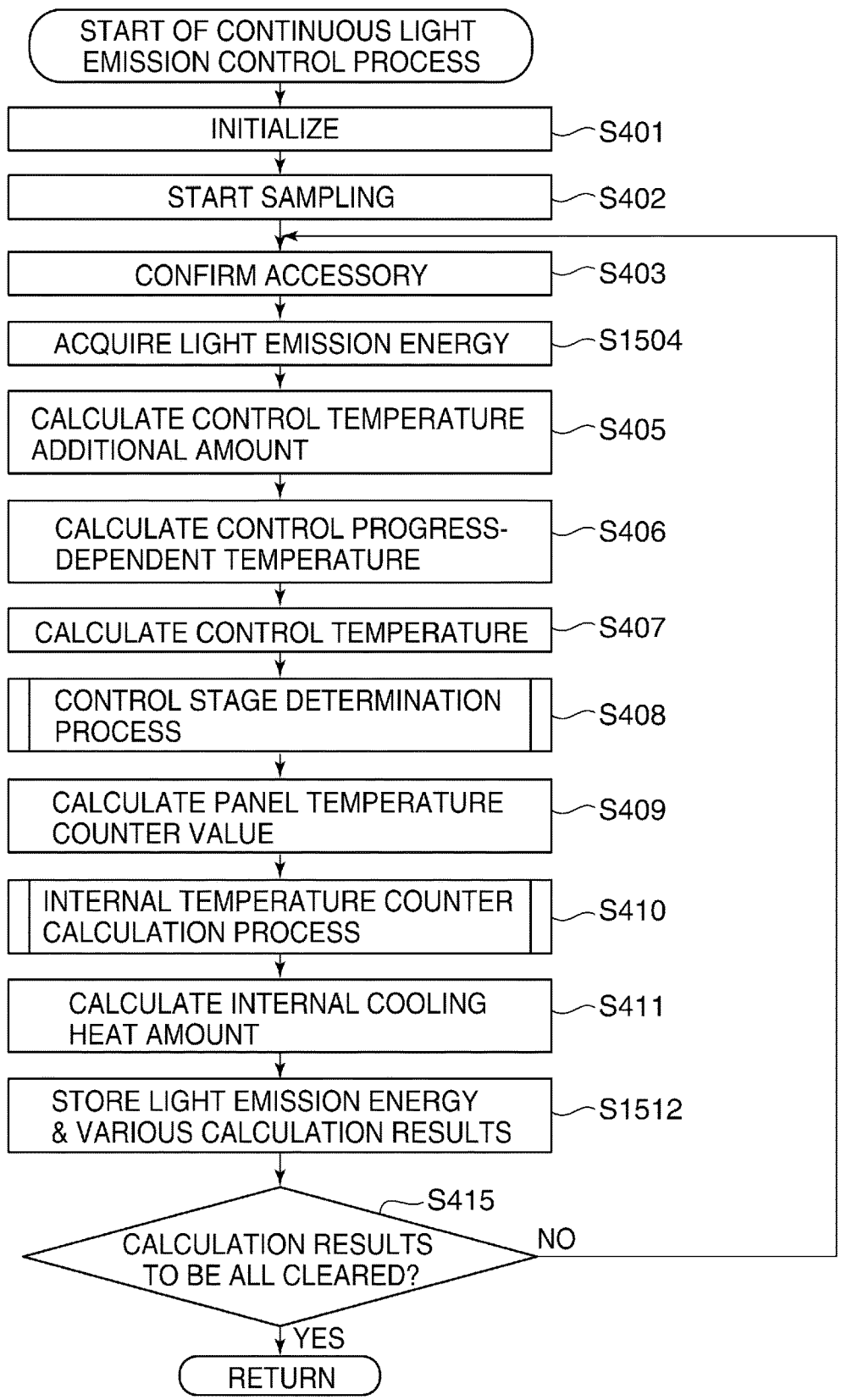
FIG. 15 is a flowchart of a continuous light emission control process performed by a strobe as a lighting device according to a second embodiment of the present invention.

FIG. 15 is a flowchart of a continuous light emission control process performed by the strobe 300 as the lighting device according to the second embodiment. Note that in FIG. 15, the same steps as those of the continuous light emission control process in FIG. 4 are denoted by the same step numbers, and description thereof is omitted. Further, the other processes in the second embodiment are the same as those described in the first embodiment.

After confirming an optical accessory, the strobe microcomputer 310 acquires the light emission energy NL of light emission performed during sampling (step S1504). The strobe microcomputer 310 calculates the light emission energy NL based on the voltage of the main capacitor 302$d$, the integrated value of the light emission amount obtained from the photodiode 314, or the light emission command from the camera body 100.

First, a description will be given of the case where the light emission energy NL is calculated based on the voltage of the main capacitor 302$d$.

Assuming that a voltage of the main capacitor 302$d$ before light emission is represented by bVCM, and a voltage of the same after light emission is represented by aVCM, an energy ECZ is calculated based on a difference between the squares of the voltages before and after light emission, by the following equation (22):

$$ECZ = Zo \times (bVCM^2 - aVCM^2)/Os + Zg \quad (22)$$

More specifically, in the above equation, the strobe microcomputer 310 obtains the before-light-emission voltage bVCM and the after-light-emission voltage aVCM from A/D converted values of respective voltages of the main capacitor 302$d$. Further, the strobe microcomputer 310 adjusts a gain Os in accordance with an output range used in calculations for continuous light emission control, described hereinafter.

Symbols Zo and Zg represent a zoom position-dependent coefficient and a zoom position-dependent correction variable each representative of a degree of the influence on the optical panel 307, which vary with the zoom position. The coefficient and variable are set based on an effective area of strobe light passing through the optical panel 307 for each zoom position, a distance between the optical panel 307 and the discharge tube 305 for each zoom position, a degree of light collected by the reflection umbrella 306, and so forth.

Next, the strobe microcomputer 310 calculates the light emission energy NL by converting the energy ECZ by the following approximate equation (23):

$$NL = \alpha \times ECZ + \beta \quad (23)$$

Note that the coefficient $\alpha$ and variable $\beta$ are each different depending e.g. on the configuration of the strobe 300, and are adjusted based on the measured data obtained in advance.

Next, a description will be given of the case where the light emission energy NL is calculated based on the integrated value of the light emission amount obtained from the photodiode 314.

The strobe microcomputer 310 calculates the energy ECZ based on the integrated value AL of the light emission amount obtained after light emission by the following equation (24):

$$ECZ = Zo \times AL/Os + Zg \quad (24)$$

That is, the strobe microcomputer 310 calculates the energy EC as an approximate energy by adjusting the gain Os in accordance with the aforementioned output range used in the calculations of continuous light emission control. Then, similar to the case where the light emission energy NL is calculated based on the voltage of the main capacitor 302$d$, the strobe microcomputer 310 calculates the light emission energy NL by the equation (23). Note that a conversion table defining a relationship between the integrated value AL of the light emission amount and the light emission energy NL may be stored e.g. in the EEPROM, and the light emission energy NL may be determined using the conversion table.

In the case where the light emission energy NL is calculated based on a light emission command sent from the camera body 100, the energy ECZ is calculated as an approximate energy by adjusting the gain Os in accordance with the aforementioned output range.

Assuming that the light emission command sent from the camera body 100 is represented by E, the energy ECZ is calculated by the following equation (25):

$$ECZ = Zo \times E/Os + Zg \quad (25)$$

After that, similar to the case where the light emission energy NL is calculated based on the voltage of the main capacitor 302$d$, the strobe microcomputer 310 calculates the light emission energy NL by the equation (23). Note that a conversion table defining a relationship between the light emission command E and the light emission energy NL may be stored e.g. in the EEPROM, and the light emission energy NL may be determined using the conversion table.

After calculating the light emission energy NL, the strobe microcomputer 310 stores the calculated light emission energy NL in the internal memory, and proceeds to the step S405.

After execution of the step S411, the strobe microcomputer 310 stores the above-mentioned light emission energy NL and the results of the above calculations in the internal memory (step S1512), and make the stored values available for the next sampling. After that, the strobe microcomputer 310 proceeds to the step S415.

As described above, in the second embodiment, the influence of light emission on the optical panel 307, which is different depending on the zoom position, is included in the light emission energy NL. As a consequence, the common control stage reference threshold value can be used for all zoom positions. Therefore, it is unnecessary to perform the zoom position change-responsive process in the second embodiment.

On the other hand, also in the second embodiment, when the optical accessory 500 is attached, the same control as in the first embodiment is performed. That is, in the second embodiment, light emission is controlled by changing the gain ν of the fifth equation of the equations (19). Alternatively, light emission is controlled by setting a different control stage reference threshold value from the control stage reference threshold value used in the normal time when the optical accessory 500 is attached.

In the first embodiment, the description is given of the method of controlling light emission by changing the gain ν of the fifth equation of the equations (19). Therefore, for the control for changing the control stage reference threshold value, a different control stage reference threshold value from that used in the normal time is set in the step S501 in FIG. 5. In this case, the light emission control by changing the gain ν of the fifth equation of the equations (19) is not performed, and hence the step S903 in FIG. 9 is omitted.

Next, a description will be given of a digital camera as an image pickup apparatus equipped with a strobe 390 as a lighting device according to a third embodiment of the present invention.

Figure 16:
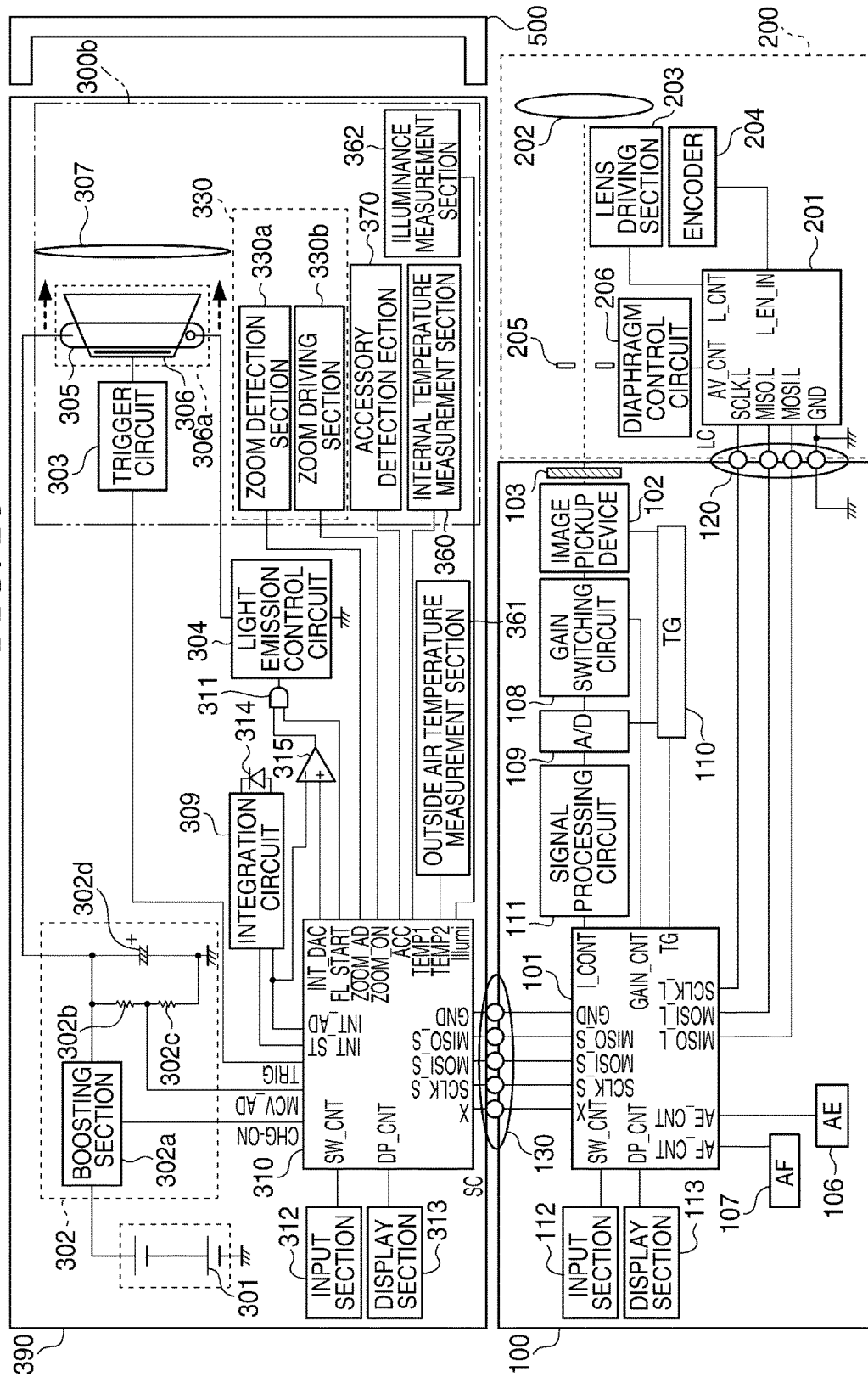
FIG. 16 is a block diagram of an example of a digital camera as an image pickup apparatus equipped with a strobe as a lighting device according to a third embodiment of the present invention.

FIG. 16 is a schematic block diagram of the digital camera as the image pickup apparatus equipped with the strobe 390 as the lighting device according to the third embodiment. The same components of the camera shown in FIG. 16 as those of the camera shown in FIG. 1 are denoted by the same reference numerals, and description thereof is omitted.

The illustrated camera differs from the camera shown in FIG. 1 in that the strobe 390 includes an internal temperature measurement section 360, an outside air temperature measurement section 361, and an illuminance measurement section 362. In the third embodiment, the continuous light emission control is performed based on the output results from the internal temperature measurement section 360, the outside air temperature measurement section 361, and the illuminance measurement section 362.

The internal temperature measurement section 360 includes a temperature sensor for measuring the internal temperature of the light emission section 300b. The outside air temperature measurement section 361 includes a temperature sensor for measuring the outside air temperature at a location on the strobe 390, which is least affected by heat generated by the light emission section 300b. Further, the illuminance measurement section 362 includes an illuminance sensor for measuring illuminance when the discharge tube 305 emits light.

Here, a description will be given of equations used in the continuous light emission control of the strobe 390.

In the step S404 in FIG. 4, the strobe microcomputer 310 calculates the light emission energy NL based on an output result from the illuminance measurement section 362. Assuming that Il represents an illuminance which is the output result from the illuminance measurement section 362, the energy EC is calculated by the following equation (26):

$$EC = \omega \times Il + \psi \quad (26)$$

Note that a coefficient ω and a variable ψ are each different depending e.g. on the configuration of the strobe 390, and are adjusted based on measured data obtained in advance.

By substituting the equation (26) in the equation (2), the light emission energy NL can be calculated.

In the step S410 in FIG. 4, the strobe microcomputer 310 calculates the internal temperature counter value Ci based on an output result from the internal temperature measurement section 360. Assuming that Ti represents an internal temperature which is the result output from the internal temperature measurement section 360, the internal temperature counter value Ci is calculated by the following equation (27):

$$preCi = \sigma \times Ti + \tau \quad (27)$$

Note that the coefficients σ and τ are each different depending e.g. on the configuration of the strobe 390, and are adjusted based on measured data obtained in advance.

Further, the estimated panel temperature Tps can be calculated using the equation (13) and the environmental temperature T as an output result from the outside air temperature measurement section 361. By correcting the result of calculation of the control temperature Tf using the estimated panel temperature Tps, it is possible to perform the continuous light emission control in accordance with the environmental temperature T.

Next, the control stage determination process will be described. In the step S501 in FIG. 5, the strobe microcomputer 310 determines whether or not the control temperature Tf obtained in the step S407 in FIG. 4 is higher than the predetermined threshold value. When the optical accessory 500 is attached, a control stage reference threshold value different from the control stage reference threshold value for the normal time is set. When there is a change in the control stage, the strobe microcomputer 310 updates the result of determination to the changed control stage, and stores the updated result of determination in the internal memory. After that, the strobe microcomputer 310 proceeds to the step S502.

After that, the same processes as those in the first embodiment are performed, followed by terminating the continuous light emission control. However, in the third embodiment, the method of controlling light emission by changing the gain ν of the fifth equation of the equations (19) is not used, and hence the step S903 in FIG. 9 is omitted.

As described above, in the third embodiment, the continuous light emission control is performed based on the output results from the internal temperature measurement section 360, the outside air temperature measurement section 361, and the illuminance measurement section 362, which are provided in the strobe 390.

Next, a description will be given of a digital camera as an image pickup apparatus equipped with a strobe as a lighting device according to a fourth embodiment of the present invention. Note that the camera according to the fourth embodiment has the same configuration as the camera shown in FIGS. 1 and 2, and hence description thereof is omitted.

In the above-described first embodiment, light emission is controlled assuming a rise in the temperature of the optical panel 307 and estimating a temperature detected when the optical accessory 500 is attached. On the other hand, in the fourth embodiment, the number of times of continuous light emission allowed to be executed is directly set according to whether or not the optical accessory 500 is attached and the type of the optical accessory 500 to thereby prevent the optical panel 307 from being damaged even when the strobe microcomputer 310 is low in processing performance.

Figure 17:
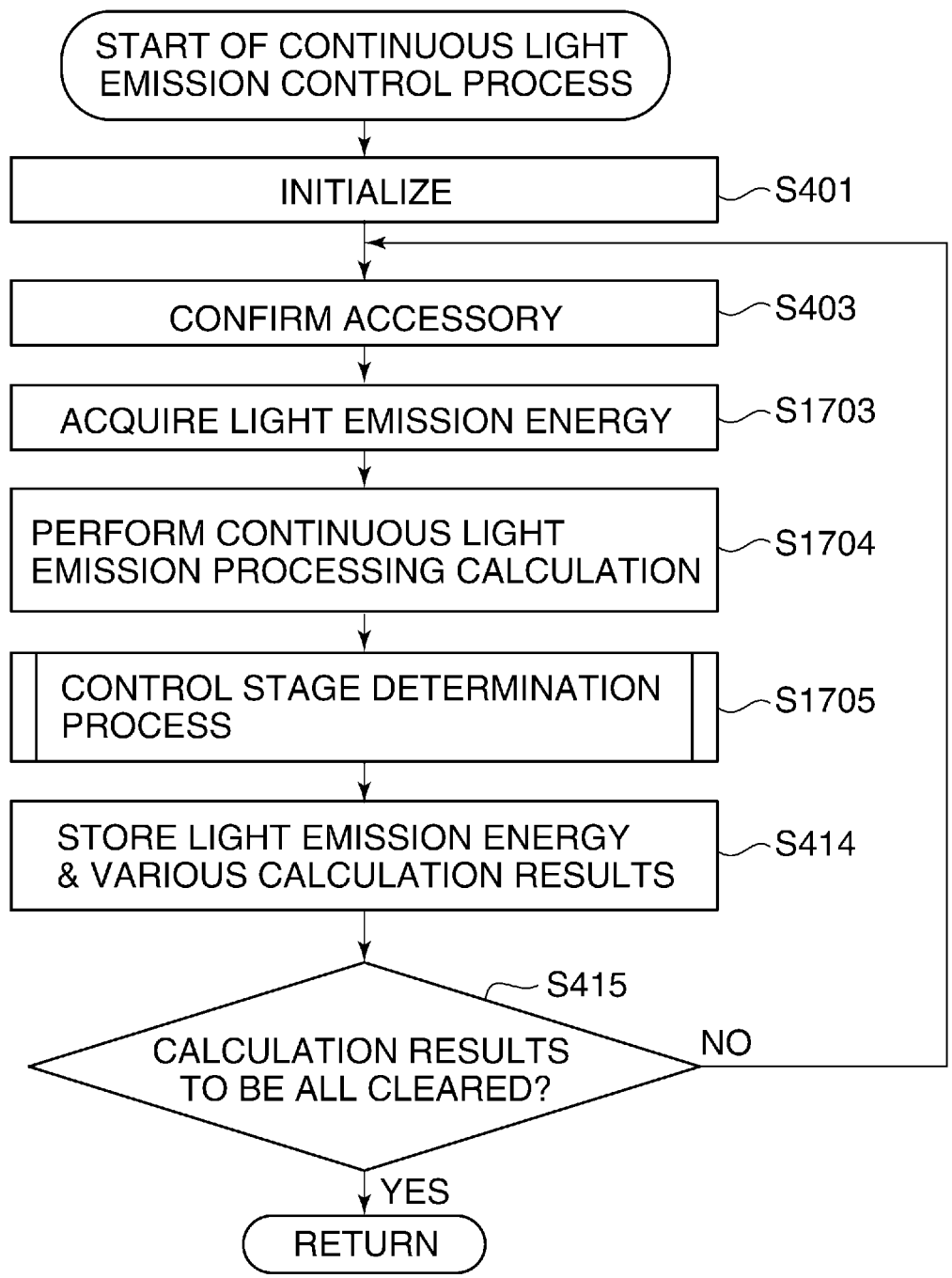
FIG. 17 is a flowchart of a continuous light emission control process performed by a strobe as a lighting device according to a fourth embodiment of the present invention.

FIG. 17 is a flowchart of a continuous light emission control process performed by the strobe 300 as the lighting device according to the fourth embodiment of the present invention. Note that in FIG. 17, the same steps as those of the continuous light emission control process in FIG. 4 are denoted by the same step numbers, and description thereof is omitted. Further, the other processes in the fourth embodiment are the same as those described in the first embodiment.

After confirming an optical accessory, the strobe microcomputer 310 acquires the light emission energy NL (step S1703). In the step S1703, the strobe microcomputer 310 acquires the light emission energy NL in the same manner as described in the first or second embodiment.

In the present embodiment, for simplicity of the description, the strobe microcomputer 310 acquires the light emission energy NL in the same manner as described in the second embodiment. However, it is not necessarily required to acquire the sum of the light emission energies NL obtained at the sampling times, indicated by the equation (5). In a case where the steps S405 to S411 in FIG. 4 are not executed, the light emission energy NL may be acquired not in each sampling but in each light emission timing.

The following description will be given of a case where the light emission energy NL is acquired in each light emission timing. After acquiring the light emission energy NL, the strobe microcomputer 310 stores the acquired light emission energy NL in the internal memory. Then, the strobe microcomputer 310 proceeds to a step S1704.

Then, the strobe microcomputer 310 performs continuous light emission processing calculation (step S1704). In the continuous light emission processing calculation, the strobe microcomputer 310 performs counting for changing the number of times of light emission based on the optical accessory information obtained in the step S403. For example, the strobe microcomputer 310 performs counting for adding a calculated value of the light emission energy NL whenever light emission is executed. Further, the strobe microcomputer 310 subtracts a predetermined amount from an integral value of the light emission energy NL whenever a predetermined time period elapses.

When the continuous light emission processing calculation is finished, the strobe microcomputer 310 stores the result of the calculation in the internal memory. Next, the strobe microcomputer 310 determines whether or not the result of the calculation, obtained in the step S1704, is larger than a predetermined threshold value, i.e. whether or not the control stage has reached a warning stage (step S1705).

A threshold value S used for determination when setting the number of times of light emission is calculated, with FNL representing the light emission energy corresponding to full light emission, and N representing the number of times of light emission, by the following equation (28):

$$S = FNL \times N \tag{28}$$

By changing the light emission number N based on the optical accessory information using the equation (28), it is possible to directly set the number of times of light emission. The number N of times of light emission may be empirically determined e.g. according to the configurations of the strobe 300 and the optical accessory 500. Note that the threshold value S has the same meaning as the sum of the light emission energies, and hence the threshold value S may be set as the total light emission amount. Then, the strobe microcomputer 310 executes the processing described in the step S408 in FIG. 4, and proceeds to the step S414.

As described above, in the fourth embodiment, light emission can be controlled by setting the number of times of continuous light emission or the total light emission amount, and hence it is possible to easily change the light emission control performed when the optical accessory 500 is attached without accurately calculating a rise in the temperature of the optical panel 307.

Although in the above-described embodiments, the strobe microcomputer is described as a microcomputer-incorporated one-chip IC circuit, a circuit, such as a dedicated calculation section, may be provided. Further, the above-described continuous light emission control process is described by way of example, and the process may be performed in an order different from the steps of the continuous light emission control process on an as-needed basis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a control method based on the functions of the above-described embodiments may be caused to be executed by the lighting device. Further, a control program implementing the functions of any of the above-described embodiments may be caused to be executed by a computer provided in the lighting device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-041116 filed Mar. 3, 2016, which is hereby incorporated by reference herein in its entirety.

What is claimed is:

1. A lighting device comprising:
   a light source;
   a detection sensor configured to detect that a specific optical accessory for changing characteristics of light irradiated from said light source is attached;
   at least one processor; and
   a memory storing instructions which cause the at least one processor to perform operations of a suppression unit, wherein:

the suppression unit configured to perform processing for suppressing a temperature rise of the lighting device, based on a result of detection by said detection sensor, wherein said suppression unit performs processing for suppressing the temperature rise of the lighting device according to a total of values each added according to light emission from said light source, and makes a value added according to light emission from said light source larger in a case where said detection sensor detects that the specific optical accessory is attached than in a case where said detection sensor does not detect that the specific optical accessory is attached.

2. The lighting device according to claim 1, further comprising:
an optical panel,
wherein the memory further stores instructions which cause the at least one processor to perform operations of
an irradiation angle change unit configured to change an irradiation angle of light irradiated from aid light source by changing a relative position between said light source and said optical panel, and
wherein said suppression unit sets a threshold value for switching the processing for suppressing the temperature rise, based on the relative position.

3. The lighting device according to claim 2, wherein said suppression unit makes larger the value added according to light emission from said light source, as said light source and said optical panel are closer to each other.

4. The lighting, device according to claim 1, wherein said suppression unit makes a number of times of continuous light emission allowed to be executed smaller in a case where said detection sensor detects that the specific optical accessory is attached than in a case where said detection sensor does not detect that the specific optical accessory is attached.

5. The lighting device according to claim 1, wherein said suppression unit makes a total light emission amount of continuous light emission smaller in a case where said detection sensor detects that the specific optical accessory is attached than in a case where said detection sensor does not detect that the specific optical accessory is attached.

6. The lighting device according to claim 1, wherein said suppression unit makes longer a time period during which light emission from said light source is inhibited, as the processing for suppressing the temperature rise.

7. The lighting device according to claim 1, wherein said suppression unit makes smaller charging current supplied to a capacitor that accumulates electric energy for causing light emission from said light source, as the processing for suppressing the temperature rise.

8. An image pickup apparatus including:
an image sensor configured to perform image pickup of an object via an image pickup optical system to thereby obtain an image, and
a lighting device,
wherein said lighting device comprises:
a light source;
a detection sensor configured to detect that a specific optical accessory for changing characteristics of light irradiated from said light source attached;
at least one processor; and
a memory storing instructions which cause the at least one processor to performing operations of a suppression unit, wherein:
the suppression unit configured to perform processing for suppressing a temperature rise of said lighting device, based on a result of detection by said detection sensor,
wherein said suppression unit performs processing for suppressing the temperature rise of the lighting device according to a total of values each added according to light emission from said light source, and makes a value added according to light emission from said light source larger a case where said detection sensor detects that the specific optical accessory is attached than in a case where said detection sensor does not detect that the specific optical accessory is attached.

9. A method of controlling a lighting device, comprising:
detecting that a specific optical accessory for changing characteristics of light irradiated from a light source is attached, by a detection sensor; and
performing processing for suppressing a temperature rise of the lighting device, based on a result of detection by the detection sensor, by a at least one processor programmed to operate as a suppression unit,
wherein said processing for suppressing the temperature rise of the lighting device is performed according to a total of values each added according to light emission from said light source, and makes a value added according to light emission from said light source larger in a case where said detection sensor detects that the specific optical accessory is attached than in a case where said detection sensor does not detect that the specific optical accessory is attached.

* * * * *